US012181858B1

(12) United States Patent
Hammersley et al.

(10) Patent No.: US 12,181,858 B1
(45) Date of Patent: Dec. 31, 2024

(54) COMPUTER-BASED WORKFLOW MANAGEMENT TOOLS FOR THREE-DIMENSIONAL PRINTING PROCESSES

(71) Applicant: UPMC, Pittsburgh, PA (US)

(72) Inventors: Elliott Hammersley, Pittsburgh, PA (US); April Krivoniak, Pittsburgh, PA (US); Denise Layne, Pittsburgh, PA (US); Mark Briercheck, Pittsburgh, PA (US); Anish Ghodadra, Pittsburgh, PA (US)

(73) Assignee: UPMC, Pittsburgh, PA (US)

( * ) Notice: Subject to any disclaimer, the term of this patent is extended or adjusted under 35 U.S.C. 154(b) by 132 days.

(21) Appl. No.: 17/834,123

(22) Filed: Jun. 7, 2022

Related U.S. Application Data

(60) Provisional application No. 63/197,640, filed on Jun. 7, 2021.

(51) Int. Cl.

| | |
|---|---|
| ***G05B 19/4099*** | (2006.01) |
| ***B29C 64/386*** | (2017.01) |
| ***B29L 31/00*** | (2006.01) |
| ***B33Y 50/00*** | (2015.01) |
| ***B33Y 80/00*** | (2015.01) |
| ***G06F 3/12*** | (2006.01) |

(52) U.S. Cl.
CPC ........ *G05B 19/4099* (2013.01); *B29C 64/386* (2017.08); *B33Y 50/00* (2014.12); *B33Y 80/00* (2014.12); *G06F 3/1207* (2013.01); *G06F 3/1256* (2013.01); *G06F 3/1275* (2013.01); *B29L 2031/753* (2013.01); *G05B 2219/35134* (2013.01); *G05B 2219/49007* (2013.01)

(58) Field of Classification Search
None
See application file for complete search history.

(56) References Cited

U.S. PATENT DOCUMENTS

| | | | | |
|---|---|---|---|---|
| 2004/0190057 A1* | 9/2004 | Takahashi | ............. | G06F 3/1205 358/1.15 |
| 2017/0148159 A1* | 5/2017 | Kreeger | ................. | G16H 30/20 |
| 2017/0372155 A1* | 12/2017 | Odry | ....................... | G06F 18/28 |
| 2019/0122073 A1* | 4/2019 | Ozdemir | ................ | G06V 20/56 |

* cited by examiner

*Primary Examiner* — Darryl V Dottin
(74) *Attorney, Agent, or Firm* — Michael D. Lazzara; Leech Tishman Fuscaldo & Lampl

(57) ABSTRACT

A computer-based workflow management method is provided for use in connection with a process for printing an object with a three-dimensional printer. The method includes executing a request queue phase comprising receiving instructions for defining a request for printing the object; executing an anatomic modeling phase comprising generating an anatomic three-dimensional model representing the object; and executing a build phase comprising printing an object in response to the generated anatomic model. The method includes generating and displaying various user interface screens programmed for visualizing different aspects of phases or stages of the three-dimensional printing process.

23 Claims, 57 Drawing Sheets

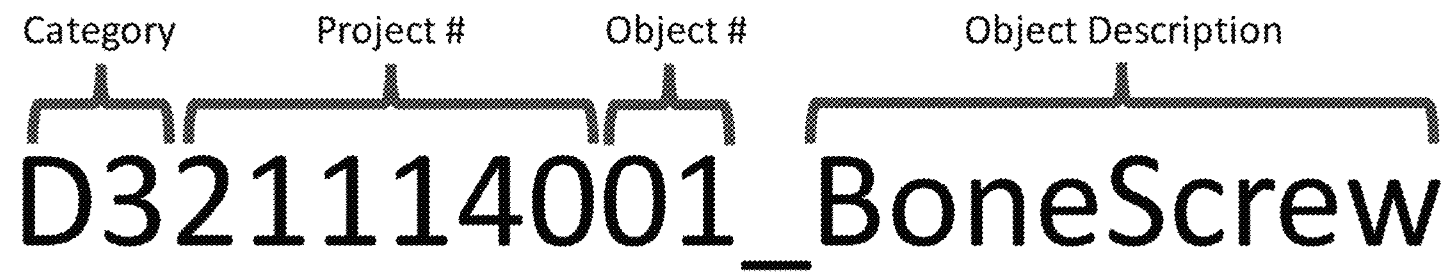

Categories
E1 – Education Model
E2 – Education Part
R1 – Research Model
R2 – Research Part
D1 – Device R&D
D2 – Device Production
D3 – Device Accessory
Q1 – QC R&D
Q2 – QC Part
Q3 – QC Accessory
V1 – Veterinary Model
V2 – Veterinary Part

Project #
Julian Date of Project Initiation appended with a counter for projects started on the same day (0-9)

Object #
Counter of Objects associated with the given project (1-99)

Object Description
Only part of the file structure, defines what the file contains

FIG. 5

Request Queue | Anatomic Phase | Build Queue | Print Phase | Inspection/Delivery | ADMIN | SEARCH | PROJECT | EQUIPMENT

| Model ID | Purpose | Anatomy | Anatomic Modelling Cost | Material Cost | Printing Cost | Processing Cost |
|---|---|---|---|---|---|---|
| Model ID_Liver | Clinical | Liver | $235.50 | $53.47 | $10.25 | $55.00 |
| Model ID_Pelvis | Research | Pelvis | $105.00 | $75.36 | $153.25 | $15.00 |
| Model ID_Brain | Clinical | Brain | $135.00 | $101.42 | $23.56 | $30.00 |

FIG. 44

Request Queue | Anatomic Phase | Build Queue | Print Phase | Inspection/Delivery | ADMIN | SEARCH | PROJECT | EQUIPMENT

| Cost Type | Printing Type | Formula | Multiplier |
|---|---|---|---|
| Anatomic Modelling | N/A | Segmentation Time * 55 + CAD Time * 55 + Review Time * 100 | 1.28 |
| Material | SLA | Resin Volume * Resin Cost + Resin Tank Cost / Resin Volume Tank Life | 1.17 |
| Material | MJF | Volume * (Nylon Cost + Fusing Agent Cost) + Surface Area * (Detailing Agent Cost + Color Agent Cost) | 1.17 |
| Printing | SLA | Print Time * 5 | 1.0 |
| Printing | MJF | 400 / (Part Volume / Total Build Part Volume) | 1.0 |
| Processing | SLA, MJF | Processing Time * 55 | 1.17 |

FIG. 45

Request Queue | Anatomic Phase | Build Queue | Print Phase | Inspection/Delivery | ADMIN | SEARCH | PROJECT | EQUIPMENT

| Equipment Identifier | Location | Equipment Type | Receive Date | Manufacturer | Install Date | Recent Maintenance Date | Retire Date |
|---|---|---|---|---|---|---|---|
| ID871239047 | Rm 123 | Label Printer | | Dymo | | | |
| 098723462 | Rm 123 | 3D Scanner | | Creaform | | | |
| FW01 | SB B | Form Wash | | Formlabs | | | |
| FC02 | SB B | Form Cure | | Formlabs | | | |
| MJF580_1 | SSB 421.2 | MJF Printer | | HP | | | |
| Form3_BP | SB B | SLA Printer | | Formlabs | | | |

FIG. 46

FIG. 47
EQUIPMENT
Preventative
+ NEW
Record ID
Type
File
Date of Maintenance
Result
Comments
20220519_PM
Optics
xxxxx.form
Pass
Compliant
098723462_LEVEL
Calibration
N/A
Fail
Support Ticket #
Hardware
+ NEW
Record ID
Type
Component
Date of Maintenance
Replacement Outcome
Comments
20220519_Support#
Optics
Spring
Completed
Functional
098723462_Support#
Calibration
LP
Unsuccessful
Support Ticket #
Firmware
+ NEW
Version
Update Date
Relevant Release Notes
Comments
1.12.20
Completed
Functional
1.13.23
Unsuccessful
Support Ticket #

Request Queue | Anatomic Phase | Build Queue | Print Phase | Inspection/Delivery | ADMIN | SEARCH | PROJECT | EQUIPMENT

| Equipment Identifier | IQ | PC | OQ | PQ |
|---|---|---|---|---|
| ID871239047 | ID871239047_IQ.docx | ID871239047_PC.docx | ID871239047_OQ.docx | ID871239047_PQ.docx |
| 098723462 | 098723462_IQ.docx | 098723462_PC.docx | 098723462_OQ.docx | 098723462_PQ.docx |
| FW01 | FW01_IQ.docx | FW01_PC.docx | FW01_OQ.docx | FW01_PQ.docx |
| FC02 | FC02_IQ.docx | FC02_PC.docx | FC02_OQ.docx | FC02_PQ.docx |
| MJF580_1 | MJF580_1_IQ.docx | MJF580_1_PC.docx | MJF580_1_OQ.docx | MJF580_1_PQ.docx |
| Form3_BF | Form3_BF_IQ.docx | Form3_BF_PC.docx | Form3_BF_OQ.docx | Form3_BF_PQ.docx |

FIG. 48

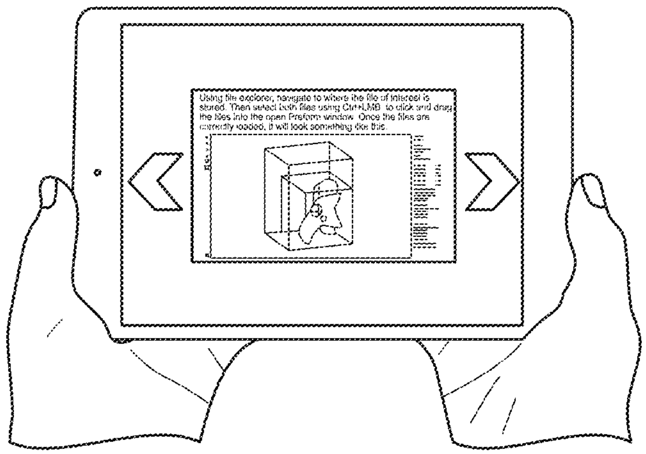

User-friendly interface
displaying step-by-step SOPs or
Work Instructions

- Ability to load existing SOP or Work Instruction documentation into step-by-step viewing format

FIG. 52A

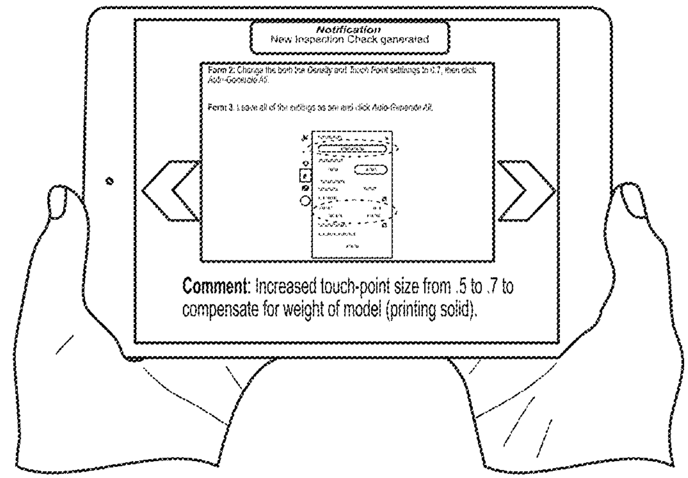

Ability to document comments
and justification when process
or instruction not followed for
specific Anatomic Record or Print Record

- New inspection check generated and included in 'Physician Review' or 'Inspection' phase check-list
- Notification sent to user who may sign-off on/approve the exception to the process or instruction

FIG. 52B

COMPUTER-BASED WORKFLOW MANAGEMENT TOOLS FOR THREE-DIMENSIONAL PRINTING PROCESSES

CROSS-REFERENCE TO RELATED APPLICATION/PRIORITY CLAIM

The present non-provisional patent application claims priority to U.S. Provisional Patent Application Ser. No. 63/197,640, filed on Jun. 7, 2021, the entirety of which is incorporated herein by reference.

FIELD OF THE INVENTION

In various embodiments, the present invention generally relates to computer-based tools, devices, and processes for directing and managing various aspects of different three-dimensional printing processes. In certain embodiments, the invention relates to providing such tools, devices, and processes at different point-of-care manufacturing operations for medical and health care devices.

BACKGROUND

There has been a long felt need in the prior art to create a workflow management tool for three-dimensional printing processes, which can provide additive manufacturing operations with the capability to produce medical devices at the point of care under good manufacturing practices and HIPAA compliance. Teams of physicians, engineers, technicians, and other personnel have faced substantial challenges with understanding each phase of design or manufacturing in which every active printing job resides. Improved computer-based tools are needed that can aid in tracking and managing the development of devices, such as medical devices and healthcare related devices. Also, technological enhancements are needed with respect to printing jobs associated with mechanical or industrial design, research and development (R&D), prototyping, or jobs used in quality control.

In view of these issues with conventional three-dimensional printing processes, enhanced computer-based tools, devices, and processes are needed for more effectively and efficiently directing and managing various aspects of different three-dimensional printing processes. Such improved technology is especially needed for point-of-care manufacturing operations for development and production of medical devices and health care related devices.

BRIEF DESCRIPTION OF THE FIGURES

FIGS. 4 and 5 schematically illustrate examples of a data structures configured for identifying three-dimensional printing models.

FIGS. 44 and 45 include examples of user interface screens illustrating visualizations of cost calculation data and accessing and manipulating cost calculation data.

FIGS. 46 through 48 include examples of user interface screens displaying data and other information associated with an Equipment Tab.

FIGS. 52A and 52B illustrate examples of how the process can be integrated with the application programming interfaces (APIs) of other products or software.

DESCRIPTION

In various embodiments of the invention, the inventors have designed and produced a workflow management process tailored to point-of-care additive manufacturing groups, servicing hospital and healthcare populations. The process was born from the necessity to create a workflow management tool which provides additive manufacturing operations, of any size, the capability to produce medical devices at the point of care under good manufacturing practices and HIPAA compliance. It allows teams of physicians, engineers, technicians, and other personnel, to easily visualize the Phase of design or manufacturing in which every active job resides.

Figure 1A:
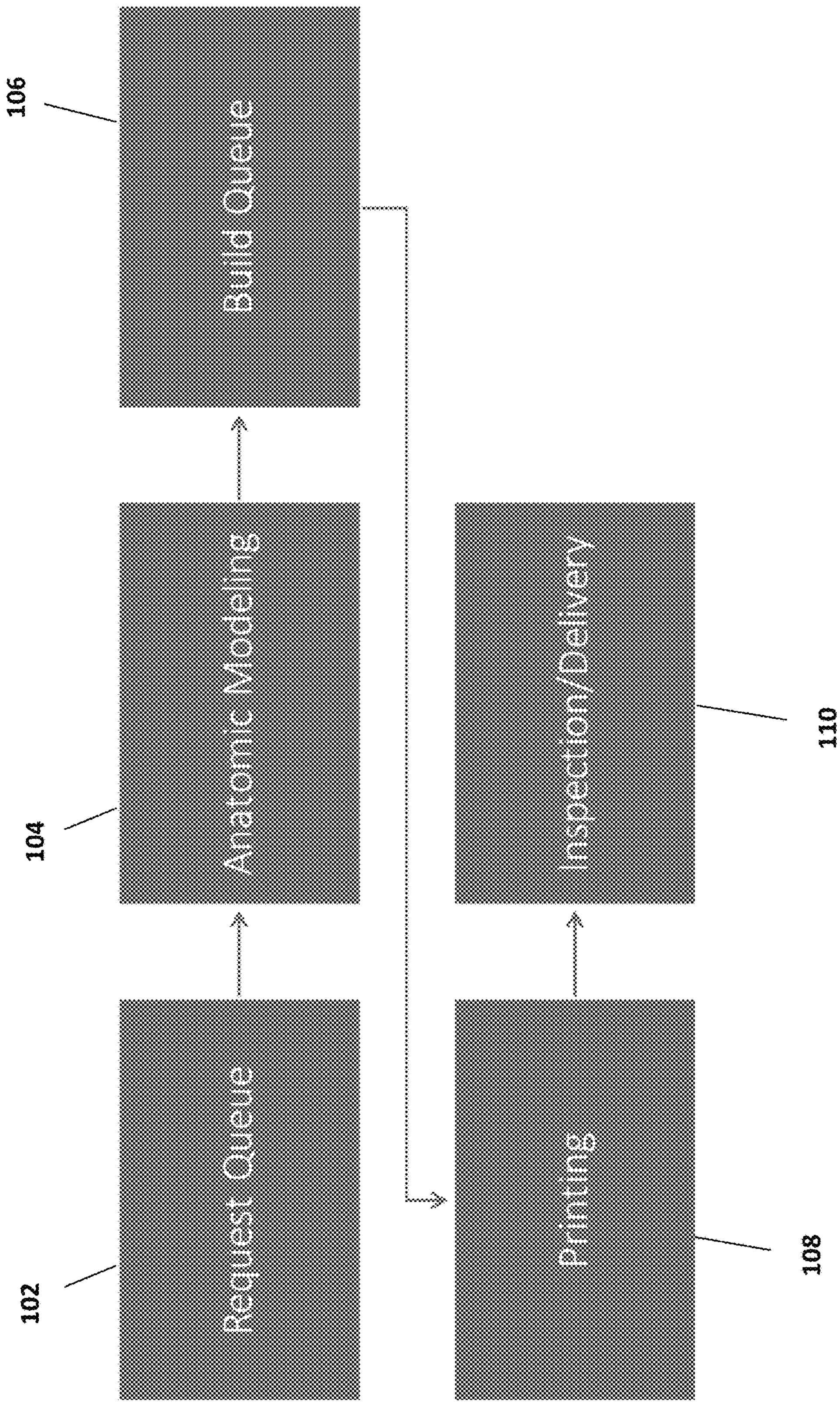
FIGS. 1A and 1B schematically illustrate different aspects of one example of a process flow for three-dimensional printing projects performed in connection with various embodiments of the invention.
Figure 1B:
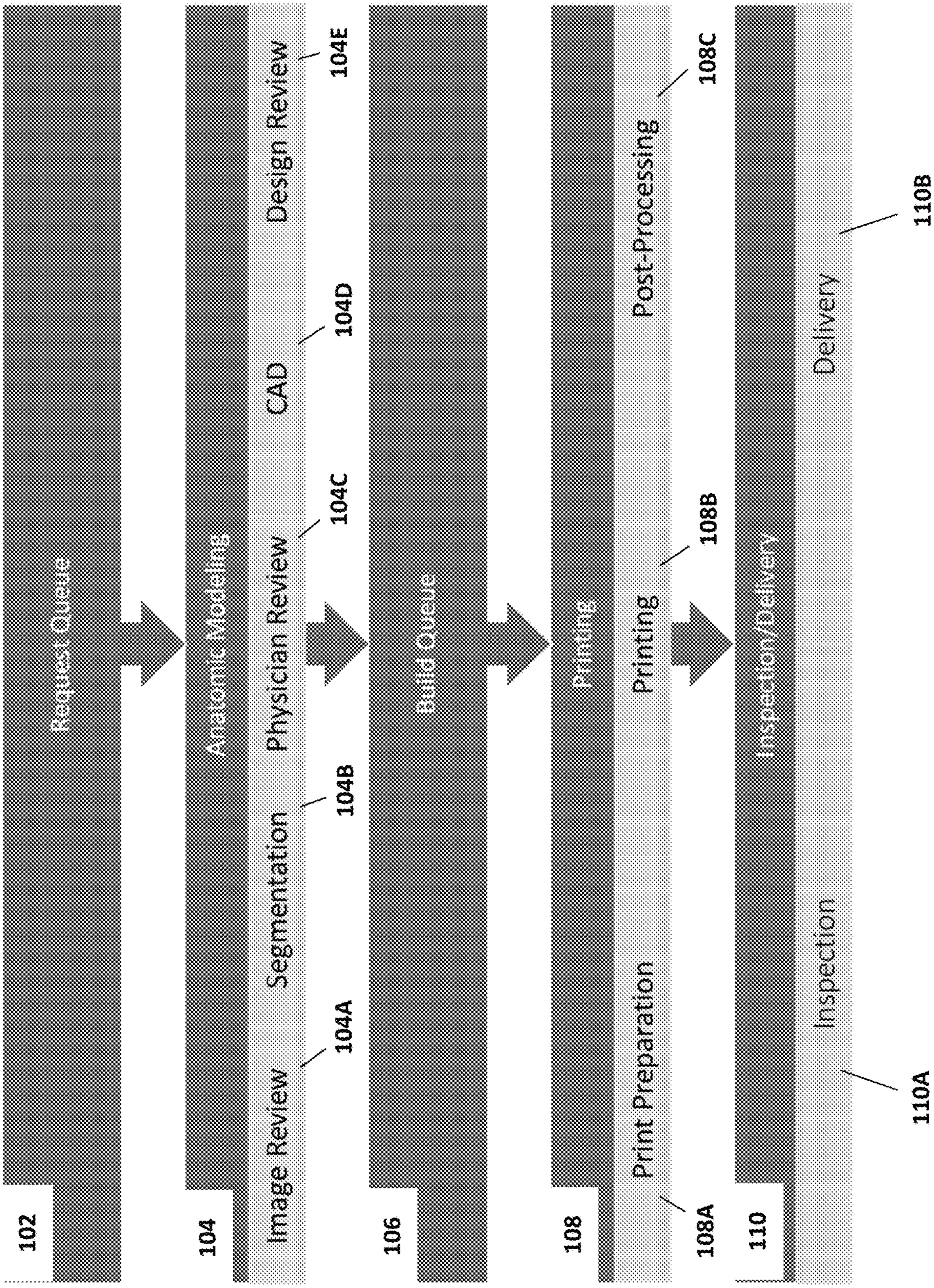

FIGS. 1A and 1B schematically illustrate different aspects of one example of a process flow for three-dimensional printing projects performed in connection with various embodiments of the invention. As applied to certain embodiments described herein, the following definitions may be employed: Record-files and data associated with a request; Object—a device, accessory, model, or part being produced; Tab-stand-alone steps in the manufacturing process, represented by clickable tabs at the top of the user interface; Phase-a group of Stages which constitute a fundamental and incremental advancement in the production of an Object; Stage-individual steps within a Phase; Category-alphanumeric combination at the beginning of a Job (Model) ID that is not associated with any clinical imaging; Job (Model) ID-combination of letters and numbers which denotes the purpose and origin of a job; Job (Model) Definition-combination of request type, imaging, and Object type used to create a Job (Model) ID; Build ID-combination of letters and numbers which denote the printing technology and date on which a job or combination of jobs was/were printed; and, Build-three-dimensional printing file, or combination of files, being printed on one printer during one printing cycle.

Given the unique nature of point-of care manufacturing, a request scheme was developed so that a user can create a request for any type of device for any purpose. To accomplish this, three parameters (entry fields) were developed that define the request and generate the unique Model ID used for end-to-end traceability. The three parameters are Model Purpose, Imaging Type, and Model Definition. Model Purpose is used to specify the end-use of the device being produced: Clinical, Research, Education, Novel Medical Device/R&D, Quality Control, Veterinary, or Unknown. Imaging Type is used to specify if the requested device will be created from imaging and if so, from what source: PACS, Outside Imaging, 3D Surface Scan, or No Imaging. Model Definition is used to specify what category of device the request falls into: Anatomical Model, Part, Accessory, R&D, or Production. Together, these fields not only generate the unique Model ID, but determine the interface presented to users (via complex conditional logic), information tracked, and file structure generated on the back-end. Additionally, requests can be attributed to a project number, with all files and associated models being tracked, stored, and linked together to assist with project management.

The production Phases primarily reflect the steps required to produce any three-dimensional printed product from medical imaging studies (Request Queue 102, Anatomic Modeling 104, Build Queue 106, Printing 108, and Inspection/Delivery 110), and Phases may be denoted by Tabs in various user interface screens. Furthermore, the development of any device can be tracked and managed using this process through custom entry options (to be discussed in subsequent sections). Each Phase can be further divided into Stages that may be delineated by columns. In one aspect, the Anatomic Modeling Phase 104 may be subdivided into these Stages: Image Review 104A, Segmentation 104B, Physician Review 104C, CAD 104D, and Design Review 104E. In another aspect, the Printing Phase 108 may be subdivided into Print Preparation 108A, Printing 108B, and Post-Processing 108C. In another aspect, the Inspection/Delivery Phase 110 may be subdivided into Inspection 110A and Delivery 110B. The Stages and their respective purpose/functionality are described in more detail herein. Using this combination of Tabs, Phases, and Stages, the process can allow the user to adapt the visualized Phases and Stages to less-specific design and manufacturing workflows, enabling the user's ability to track a variety of job types. Jobs centered around mechanical or industrial design, research and development (R&D), prototyping, or jobs used in quality control.

Figure 2:
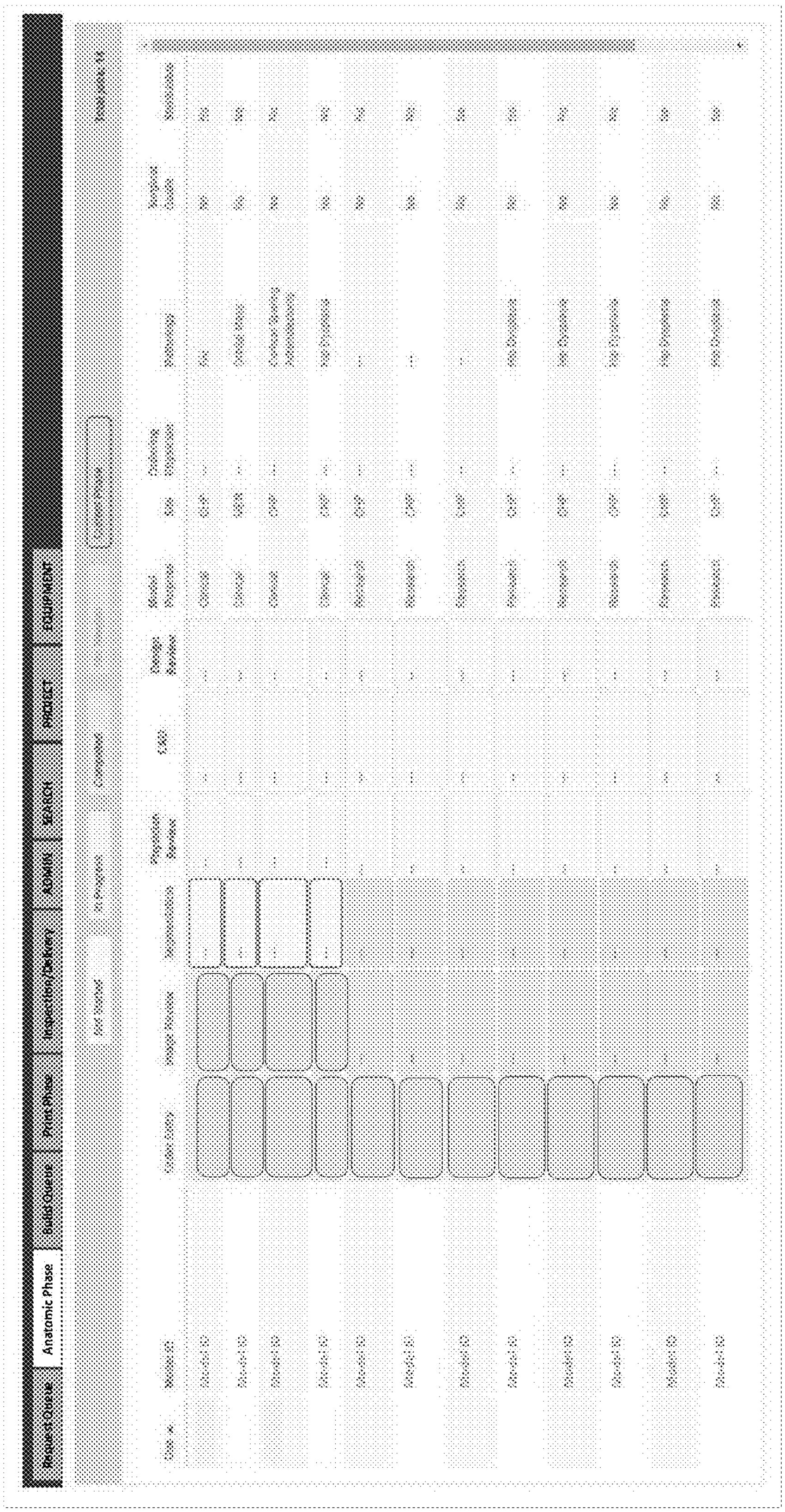
FIG. 2 displays an example of how certain content generated in the three-dimensional printing process can be displayed in a grid view.
Figure 3:
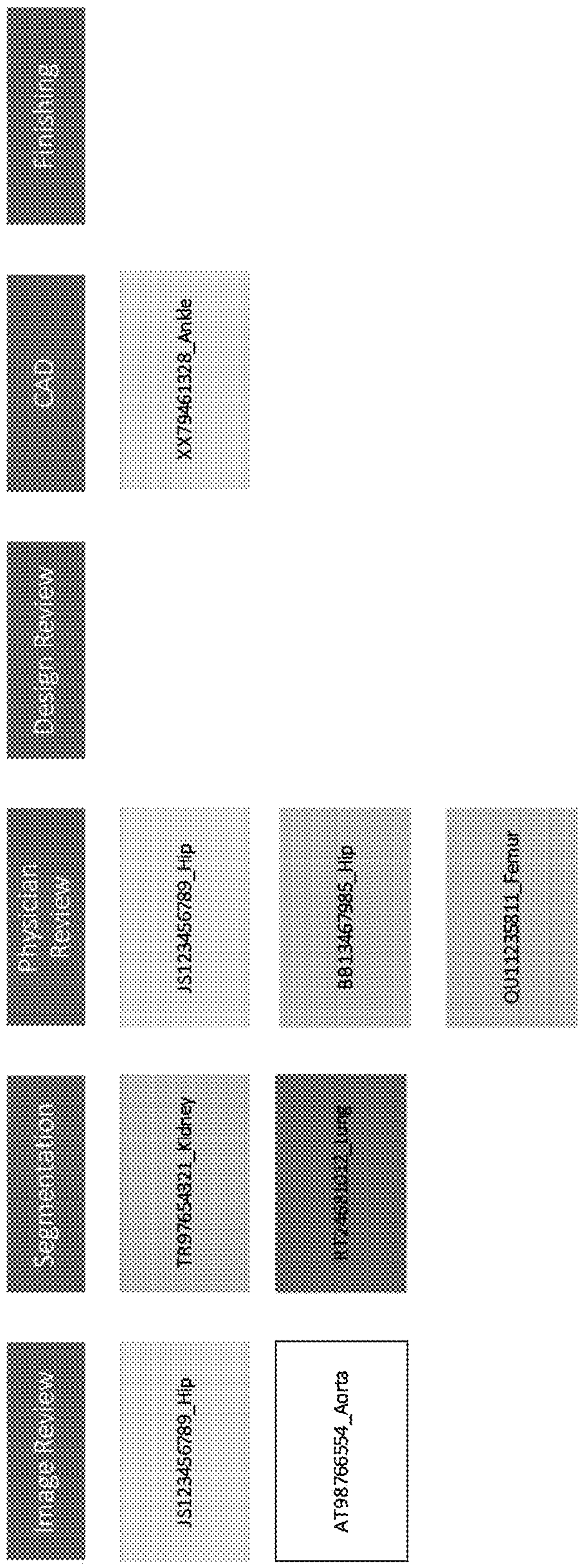
FIG. 3 displays an example of how certain content generated in the three-dimensional printing process can be displayed in a Kanban style view.

As a job moves through its production cycle, the default overview of the process allows users to visualize what jobs are in each Phase by clicking through Tabs at the top of the screen. Once viewing a Phase, all jobs in that Phase are visible with an overview of the Stages needed to complete that Phase. The graphical user interface (GUI) denotes the state of a Stage as either "not needed", "not started", "in progress", and "completed" through color coded cells and displays the name of the person who has taken ownership of each Stage; content can be displayed in either a grid view (see, e.g., FIG. 2) or a Kanban style view (see, e.g., FIG. 3), among other types of data presentation. The system allows all users within a program to understand where each job is in the production cycle and who is responsible for each Stage of the process, at a glance. If more information on a particular Stage is desired, the user can simply click on the box intersected by both the Job ID and production Stage (pointing to the desired cell in the Table), and the Stage-specific data will be displayed.

Beyond allowing teams to easily visualize and track jobs throughout their given workflows, the process stores pertinent information related to each Phase and Stage of every job. Important to point-of-care additive manufacturing groups is the need to link devices to patient records and imaging studies. When an imaging study is exported from a picture archiving and communication system (PACS), the process automatically creates a generic record that can be tailored to fit its intended use and stores patient information within the job's record. The user may add more information to the job's record in its initial state before saving the record to better visualize it within the Phases of the ensuing workflow. Once saved, the job can be visualized by the entire team and its record can be edited by team members as it moves through each Phase and Stage of the workflow. Upon saving the initial record, the process also generates a file folder structure associated with the job on a network file share. The file folder structure corresponds with the workflow Phases and is meant to help organize all files supporting a job (design files, 3D part files, manufacturing files, drawings, work instructions, etc.) in a systematic fashion. A live link to a file folder path for a job can be displayed in its record to help improve the user's efficiency in navigating between records and supporting files.

As a job moves through each Phase and Stage of the workflow, the job's record can be updated to track metrics required for identification and traceability of product, production and process controls, acceptance activities, labeling and packaging controls, and distribution. The process incorporates unique and novel naming (labeling) conventions to help users identify each job and its associated components. Further, users can record their time spent on each Phase of design and production within the process, and reports can be generated to help managers understand resource allocation. During certain Stages, custom inspection checklists will be displayed. These can be defined per product type and/or linked to custom Work Instructions and Standard Operating Procedures. Similarly, staff performing certain Stages have the ability to add custom items to the checklist for review during future Stages.

Once a job has reached the Phase where it is ready to be manufactured, users can choose an additive manufacturing technology specific to their needs. The process can be customized to display the additive manufacturing technologies or specific-brand printers a user has available to produce product. The Phases associated with manufacturing can then be tailored to each specific type of printer, allowing users to track raw material consumption and other consumables related to their printing process, in addition to time spent preparing Builds, printing, and post-processing Builds, and equipment life-cycles. Users may also customize inspection workflows, acceptance activities, label templates, and packaging and delivery protocols that are loaded into the process to help streamline the inspection, packaging, labeling, and delivery of end-product. The process can also help teams to manage manufacturing consumable inventories, client lists, and preventative maintenance and manufacturing schedules. Further, the process allows users to group or allocate jobs to specific projects, calculate costs for single jobs or all jobs associated with a specific project, and generate reports on production volumes, resource allocation, etc. The process houses a searchable archive of all past and current job records and their associated metrics.

Figure 4:
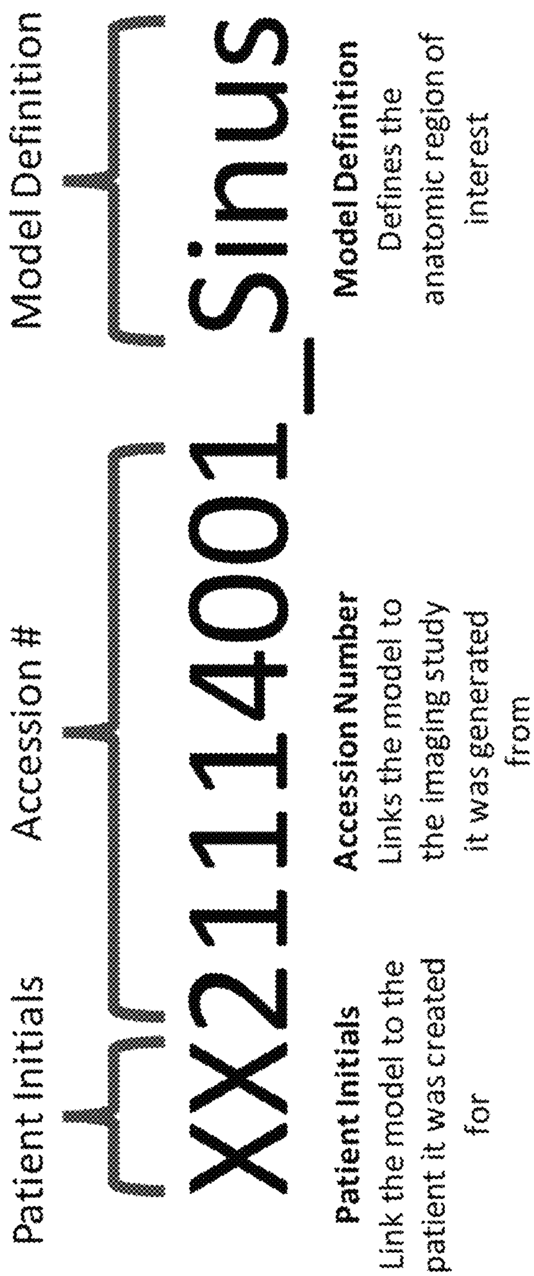

FIGS. 4 and 5 schematically illustrate examples of a data structures configured for identifying three-dimensional printing models, which can be referred to as a Model Identification (Model ID) Scheme. Due to the complexities and variabilities associated with request creation, a Model ID scheme was created to assign a meaningful identifier to each request and model/part/accessory associated with that request. This ID is used to track the product's production cycle from end-to-end and, in the case of models derived from imaging, easily connect the end-product to its raw imaging data. Model IDs can be alphanumeric and formulated such that they can readily communicate Model Purpose, Imaging Type, and Model Definition to the user. Finished products can be stamped with their identifier so even the physical Object can be linked to the digital files and all personnel and materials that went into its production. In other embodiments bar codes or other scannable indicia can be generated and applied to different products which represent the generated Model ID.

With the creation of each record, the user is presented with the option to generate a file structure on a local network file share. Detailed in a subsequent section, the file structure is an all-encompassing storage tool for files generated throughout the production cycle: Imaging, Segmentation, CAD, 3D Files, Build Files, and Photos. The Request Creation and Model Identification conventions outlined above work to provide traceability, while the File Structure serves as a uniform and organized way to physically connect all files associated with a request.

Figure 6:
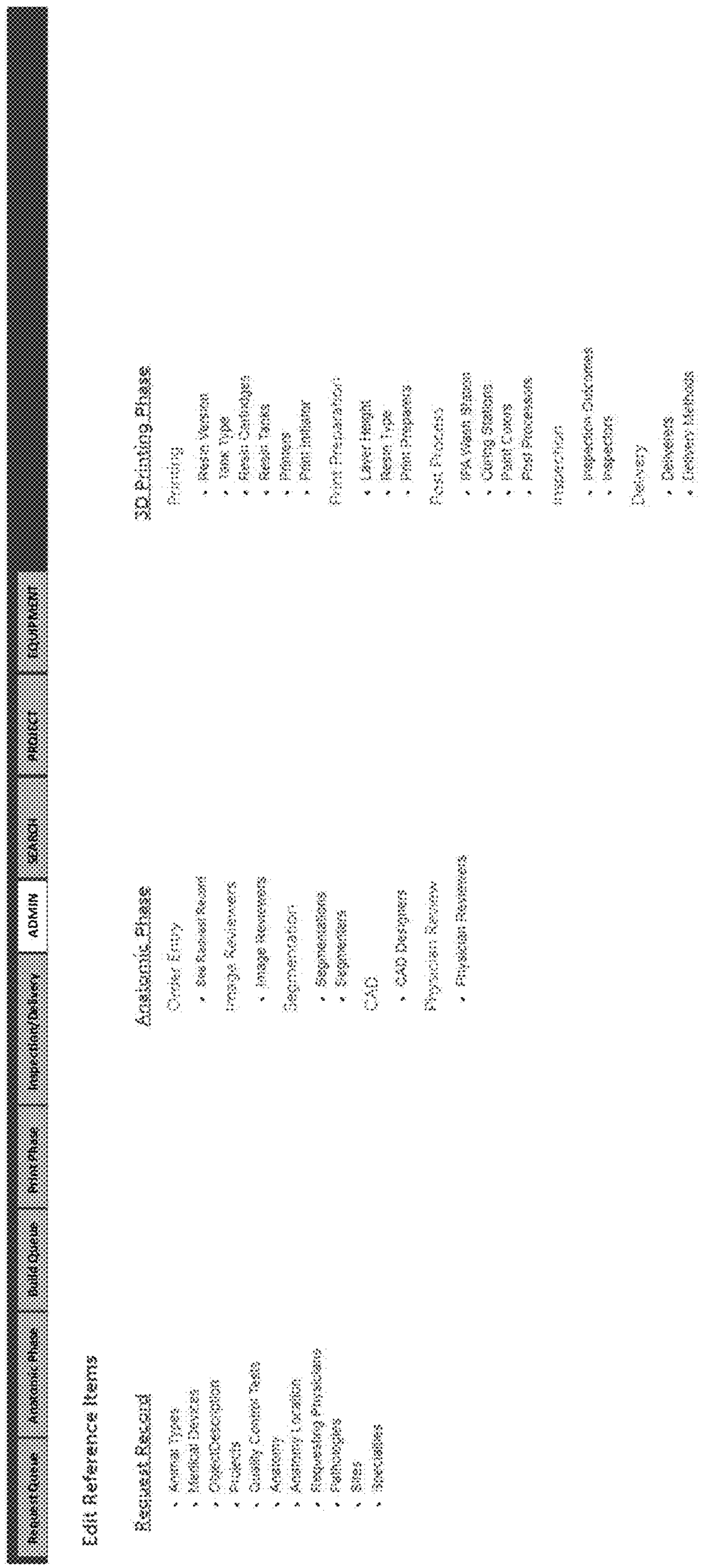
FIG. 6 includes an example of an administrative ("Admin") tab.

FIG. 6 includes an example of an administrative ("Admin") tab, wherein staff, inventory, equipment, and dropdown lists are managed, and which provides a resource for logic decisions regarding consumables management, dropdown list selections, and personnel tracking. The Admin Tab is accessible to staff members who have been given administrative privileges. For every possible entry, the Admin Tab is organized to reflect the production process and dropdown selections for equipment, personnel, consumables, etc., which can be accessible via hyperlinks. For example, to add a new Segmenter to the Segmenters dropdown list, the administrator can navigate to the Admin Tab and click on the Segmenter hyperlink under the Segmentation header. The administrator is then presented with a list of all Segmenters, when they were added, who added them, their unique identifier (used for tracking purposes), and an indicator for whether they are active in that role. To add a new Segmenter, the administrator can click on the "Add New Item" button in the top right corner of the screen. The administrator can then enter the "Display Text" (Segmenter's first and last name) and the process automatically generates an identification number to associate with the new entry. By default, the "Active Item" checkbox is selected, activating the Segmenter (making it available in the appropriate dropdown lists during production).

Figure 7:
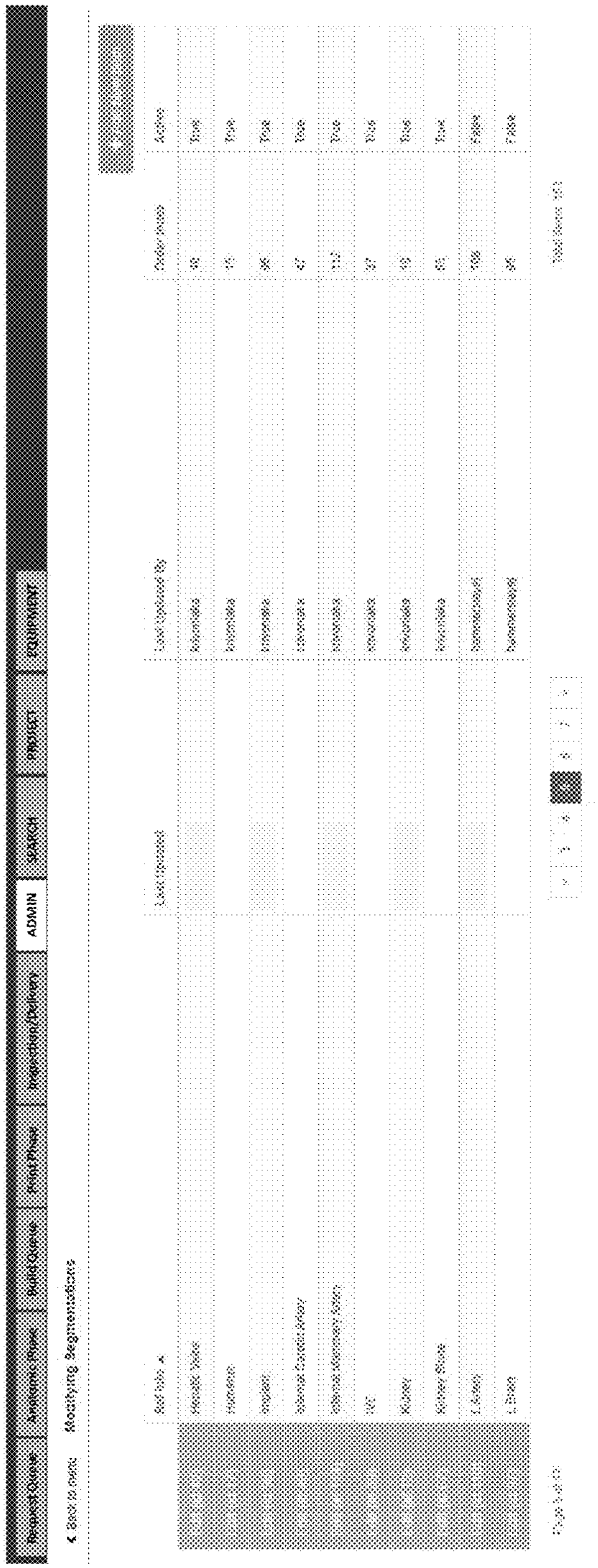
FIG. 7 illustrates an example of editing a dropdown list in the Admin Tab.
Figure 8:
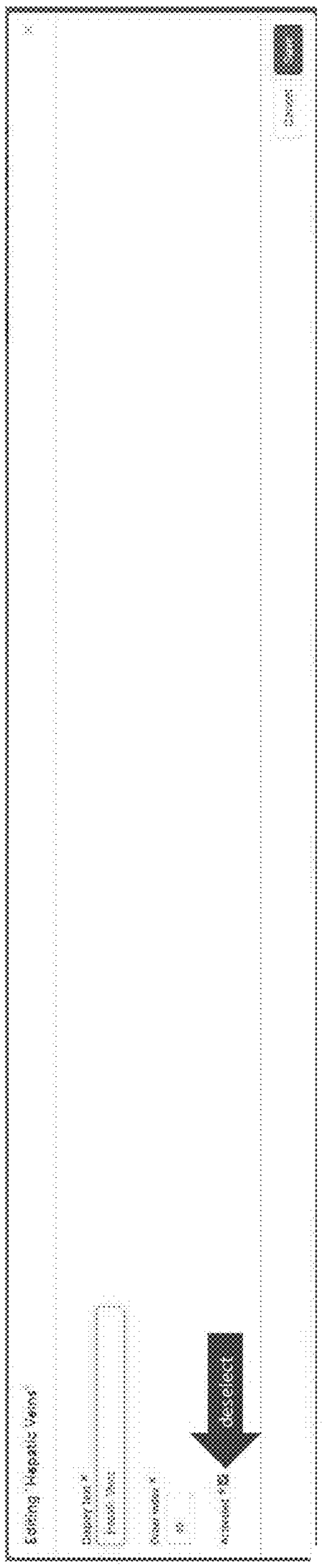
FIG. 8 includes an example of inactivation of a dropdown list entry in the Admin Tab.
Figure 9:
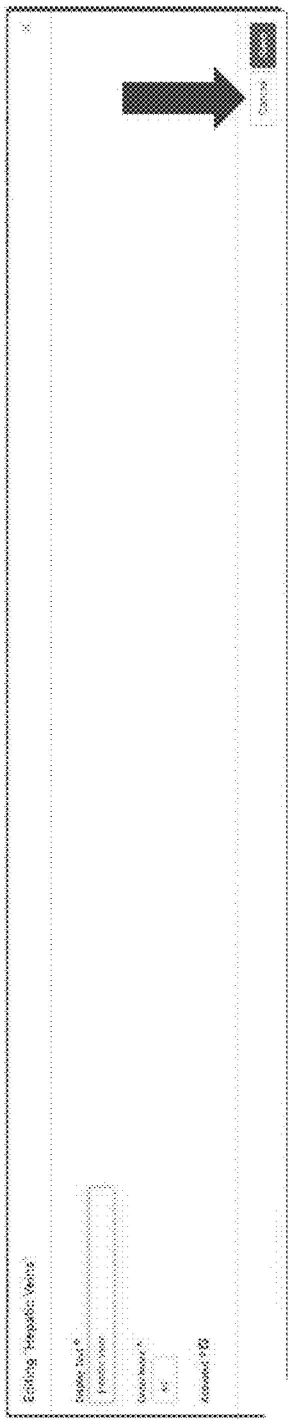
FIG. 9 illustrates an example of canceling an activation or inactivation in the Admin Tab.

To remove options from dropdown lists within the workflow, the administrator can navigate to the appropriate link in the Admin Tab, identify the record they would like to remove, click the "Edit" button in the first column of the entry's row. FIG. 7 illustrates an example of editing a dropdown list in the Admin Tab. The user can then deselect the "Active Item" checkbox in the pop-up window. An example of inactivation of a dropdown list entry in the Admin Tab is shown in FIG. 8. Additionally, during any activation or inactivation, the administrator can also cancel the process by selecting the "Cancel" button at the bottom left of the pop-up window. An example of canceling an activation or inactivation in the Admin Tab is shown in FIG. 9. Additionally, all information associated with a Build (packing density, volume, print time, etc.) is stored in this tab under the Build History hyperlink. Here, the user can select the build of interest (e.g., sorted by printing technology and printer name (ID)). The user can also generate reports tracking all of the Build metrics for any printer or printing technology over any period of time.

Figure 10:
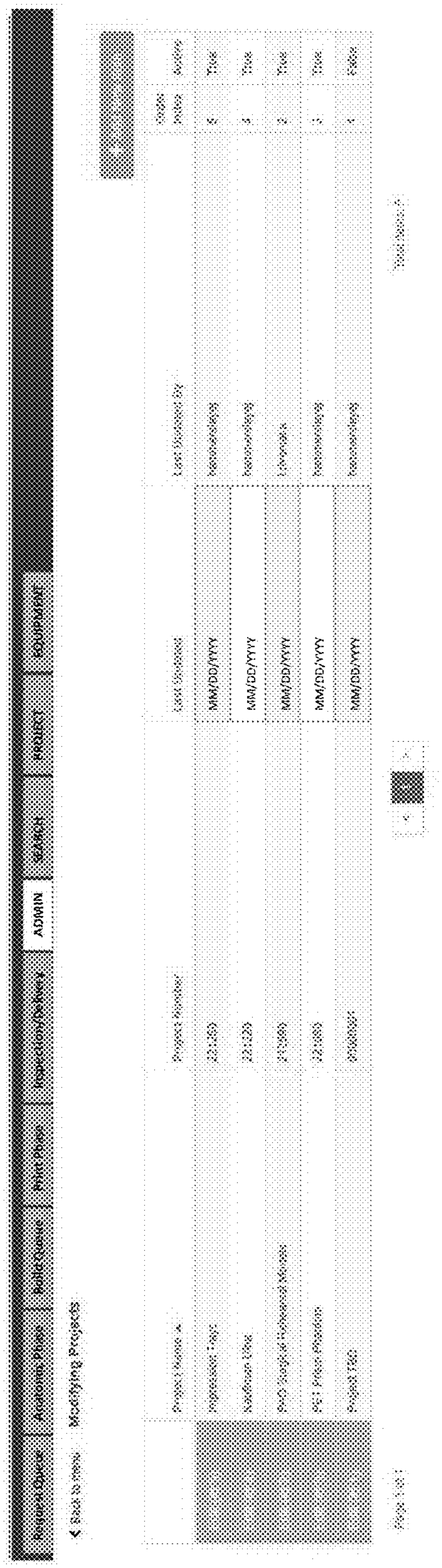
FIG. 10 includes an example of a user interface screen which can be used to access a Projects Tab.

FIG. 10 includes an example of a user interface screen which can be used to access a Projects Tab. Within this Projects Tab, all active and inactive projects are listed. The user can select the project of interest and see all records attributed to it. Additionally, the cost of each Object, the project as a whole, or some subset therein, can be obtained and invoices can be generated using Requestor and Address information stored within the Admin Tab. Additionally, personnel management and various embodiments of project management functionalities will also be included.

Figure 11:
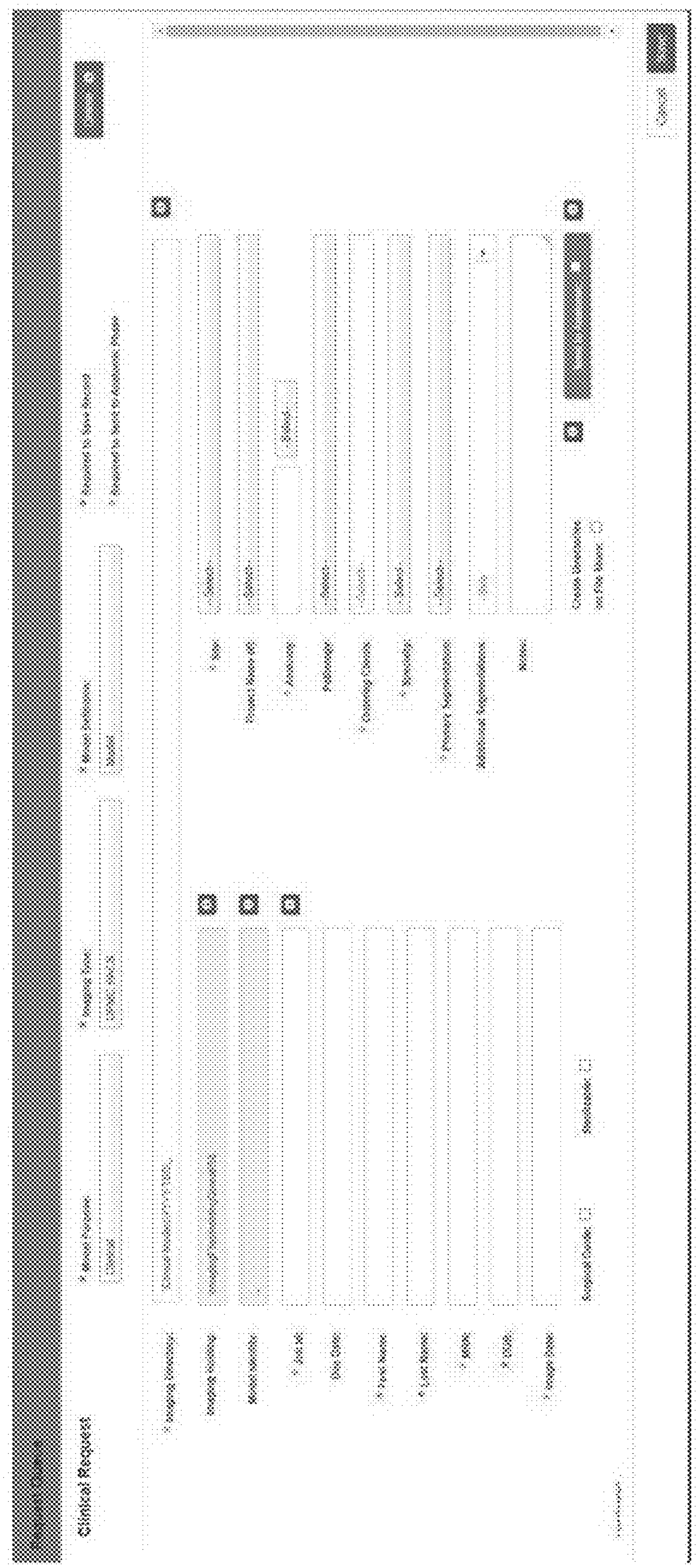
FIG. 11 includes an example of a Request Phase user interface screen which can be generated and displayed to the user.
Figure 12A:
FIG. 12A illustrates an example of defining a request for purposes of creating an anatomical model for research purposes.
Figure 12B:
FIG. 12B highlights the use of conditional logic for determining necessary fields in the user interface screen.
Figure 13:
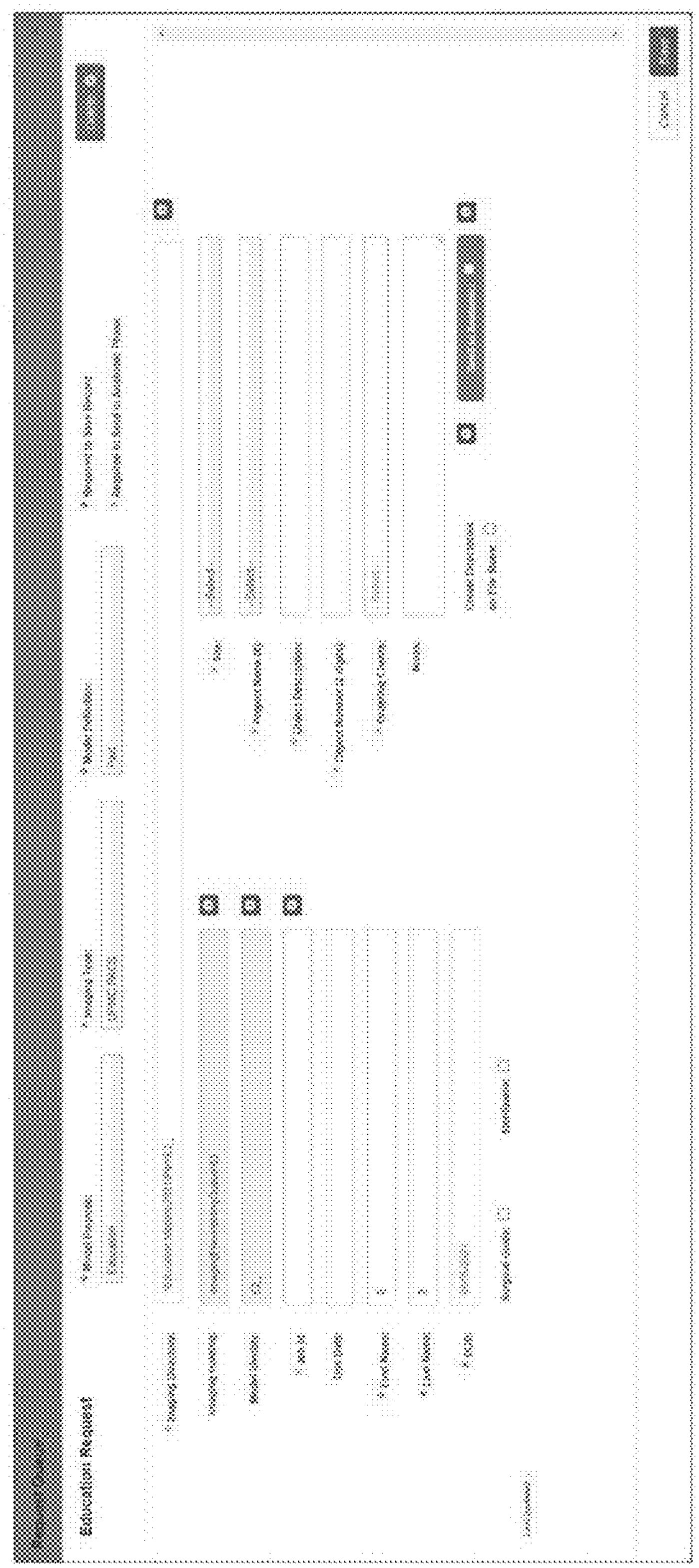
FIG. 13 illustrates an example of defining a request for purposes of creating a model for education purposes.
Figure 14:
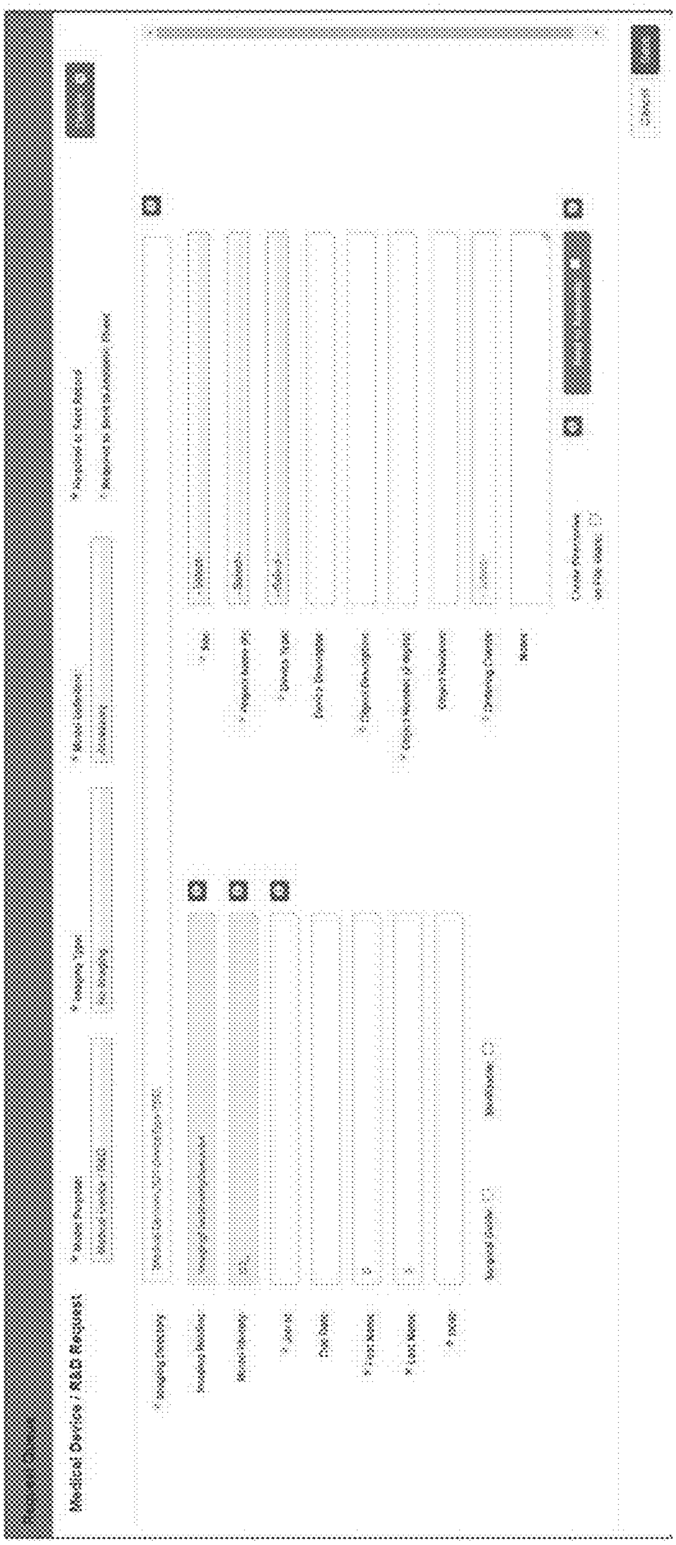
FIG. 14 illustrates an example of defining a request for purposes of creating a model for medical or research and development purposes.
Figure 15:
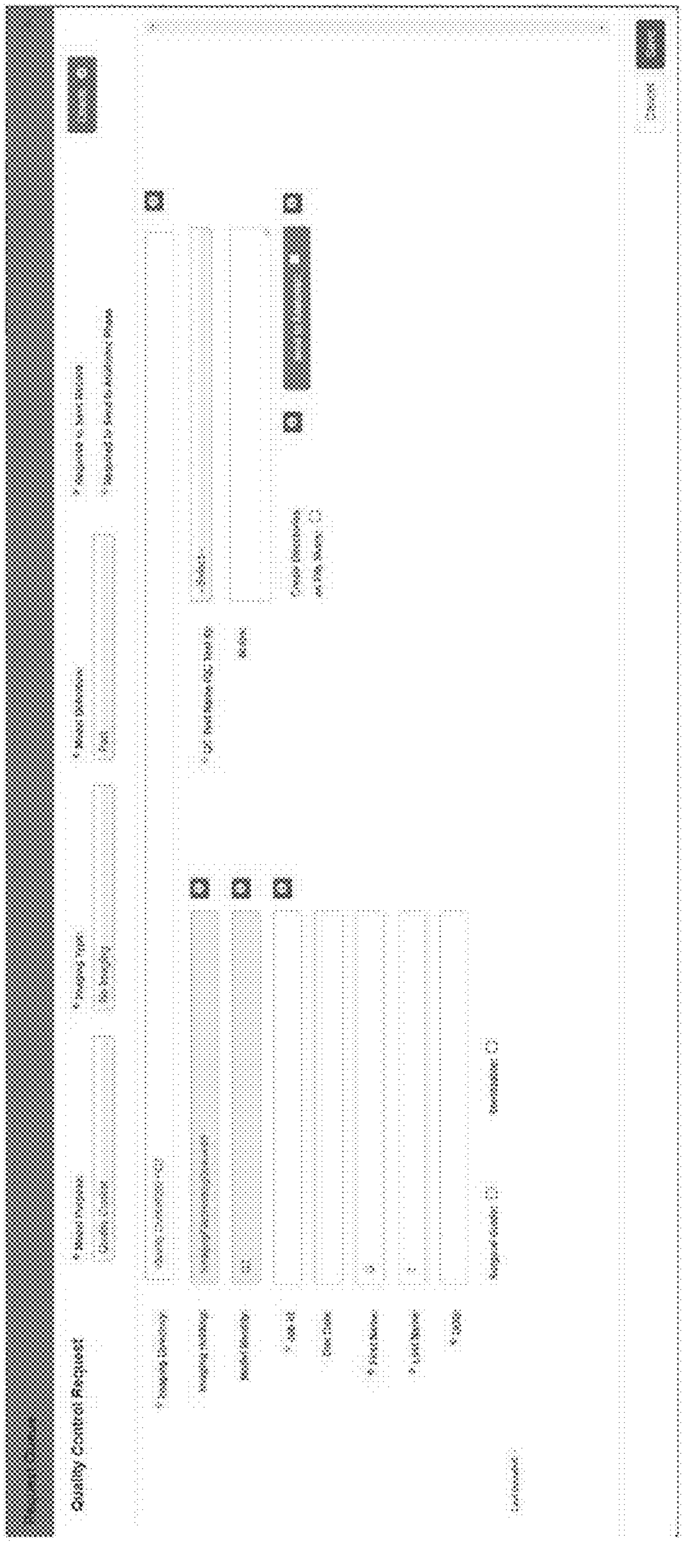
FIG. 15 illustrates an example of defining a request for purposes of creating a model for quality control purposes.
Figure 16:
FIG. 16 illustrates an example of defining a request for purposes of creating a model for veterinary purposes.
Figure 17:
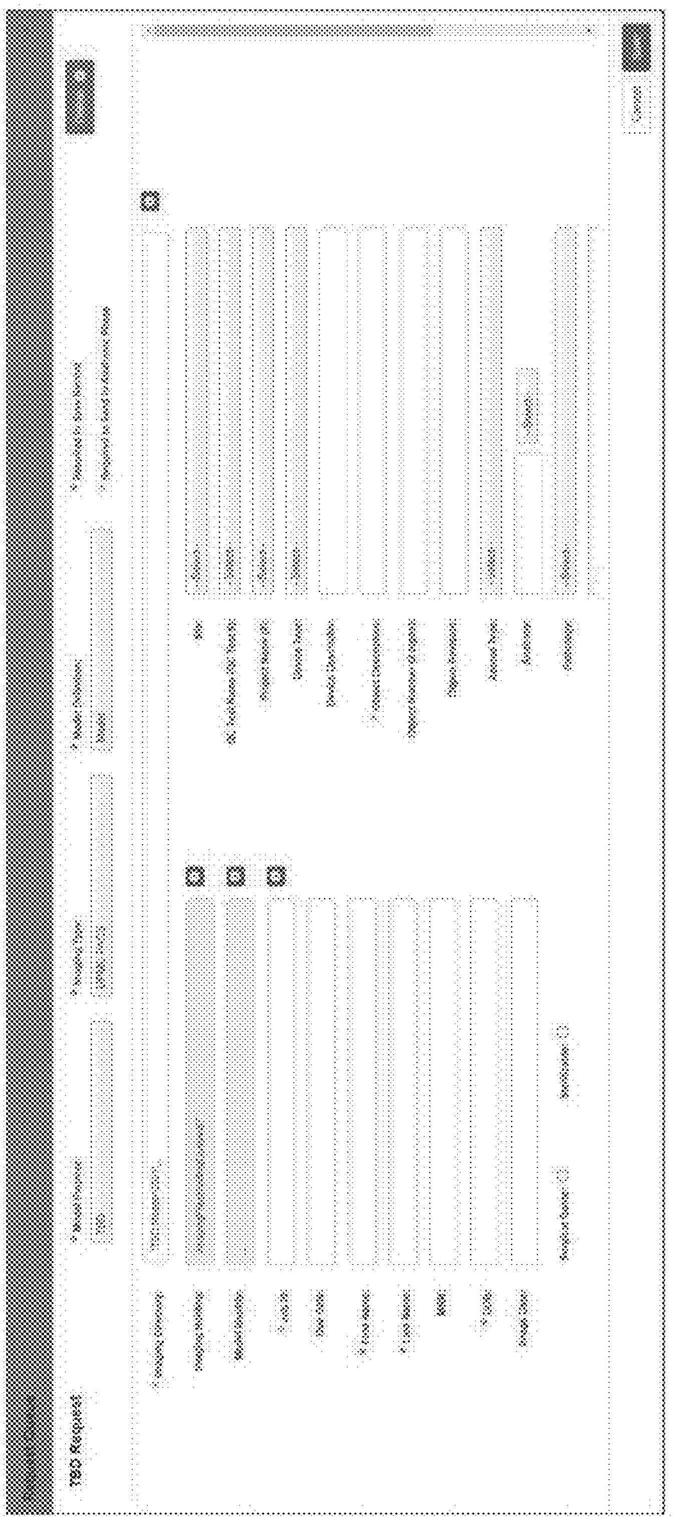
FIG. 17 illustrates an example of defining a request for purposes of creating a model for to-be-determined or general purposes.

FIG. 11 includes an example of a Request Phase user interface screen which can be generated and displayed to the user. Logic can also be used which requires certain fields to be completed to save the request, and/or others are required to send the request to the next Phase (Anatomic Phase), and a few optional fields can be provided to further define the request, if necessary. FIG. 11 illustrates an example of defining a request for purposes of creating a clinical model. FIG. 12A illustrates an example of defining a request for purposes of creating an anatomical model for research purposes. FIG. 12B highlights the use of conditional logic for determining necessary fields in the user interface screen. FIG. 13 illustrates an example of defining a request for purposes of creating a model for education purposes. FIG. 14 illustrates an example of defining a request for purposes of creating a model for medical or research and development purposes. FIG. 15 illustrates an example of defining a request for purposes of creating a model for quality control purposes. FIG. 16 illustrates an example of defining a request for purposes of creating a model for veterinary purposes. FIG. 17 illustrates an example of defining a request for purposes of creating a model for to-be-determined or general purposes.

It is important to note that the information entered in this Stage (and all other Stages) is available to the user for reference throughout the production cycle. Examples of fields which can be presented on a given user interface include: Imaging Directory-shows the user where the request's files will be generated locally; Imaging Holding-if there is an imaging study, this field will appear and is used to show the user where the file structure will be located while waiting for images to be received, once received the file will be sent to the Imaging Directory Location; Model Identity-a unique identifier which conveys purpose, imaging type, and definition, can be used for the name of all associated files within the generated file structure; Due Date—the date by which the device is needed/required (e.g., surgery date); First Name-either the patient's first name or the first part of the Category; Last Name-either the patient's last name or the second part of the Category; MRN-Medical Record Number associated with a patient for whom the model is being requested; DOB-either the patient's date of birth or the date on which a job was requested; Image Date-if applicable, the date the medical imaging was acquired; Site—identifier for the destination of the Object (delivery site); Project Name (Number)-managed in an Administrative capacity, unique identifier (name/number) for an ongoing project; QC Test Name—managed in an Administrative capacity, special Project Number for quality control operations; Device/Object Description-text that describes the requested device/Object; Object Number—unique number given to each Object that is part of a project; Object Revision—number assigned to each revision of the same part; Animal Type—defines the animal for which an Object is being made; Anatomy—text that defines the anatomy for which an anatomic model is being made; Pathology—name of the medical condition which precipitated the anatomic model request; Requesting Client—name of the person who made the request for an Object; Specialty—name of the surgical subspecialty requesting an anatomic model, or specialty of the person or persons making the request for any Object; Primary Segmentation—name of the primary anatomy to be included in an anatomic model; Secondary Segmentation—name of all other anatomy to be included in an anatomic model; Notes—a field for free text entry, used to communicate other relevant information not captured in other sections—available to be viewed and augmented throughout the production cycle; Create Directories on File Share—check box that, upon selection, creates the folder structure on the local network; sterilizability check—check box that, upon selection, indicates the Object being requested is to be manufactured in a clean environment and sterilized before delivery; and/or, Send to Anatomic—check box that, upon selection, moves a record from the Request Queue to the Anatomic Phase (assuming all required fields are completed).

Figure 18:
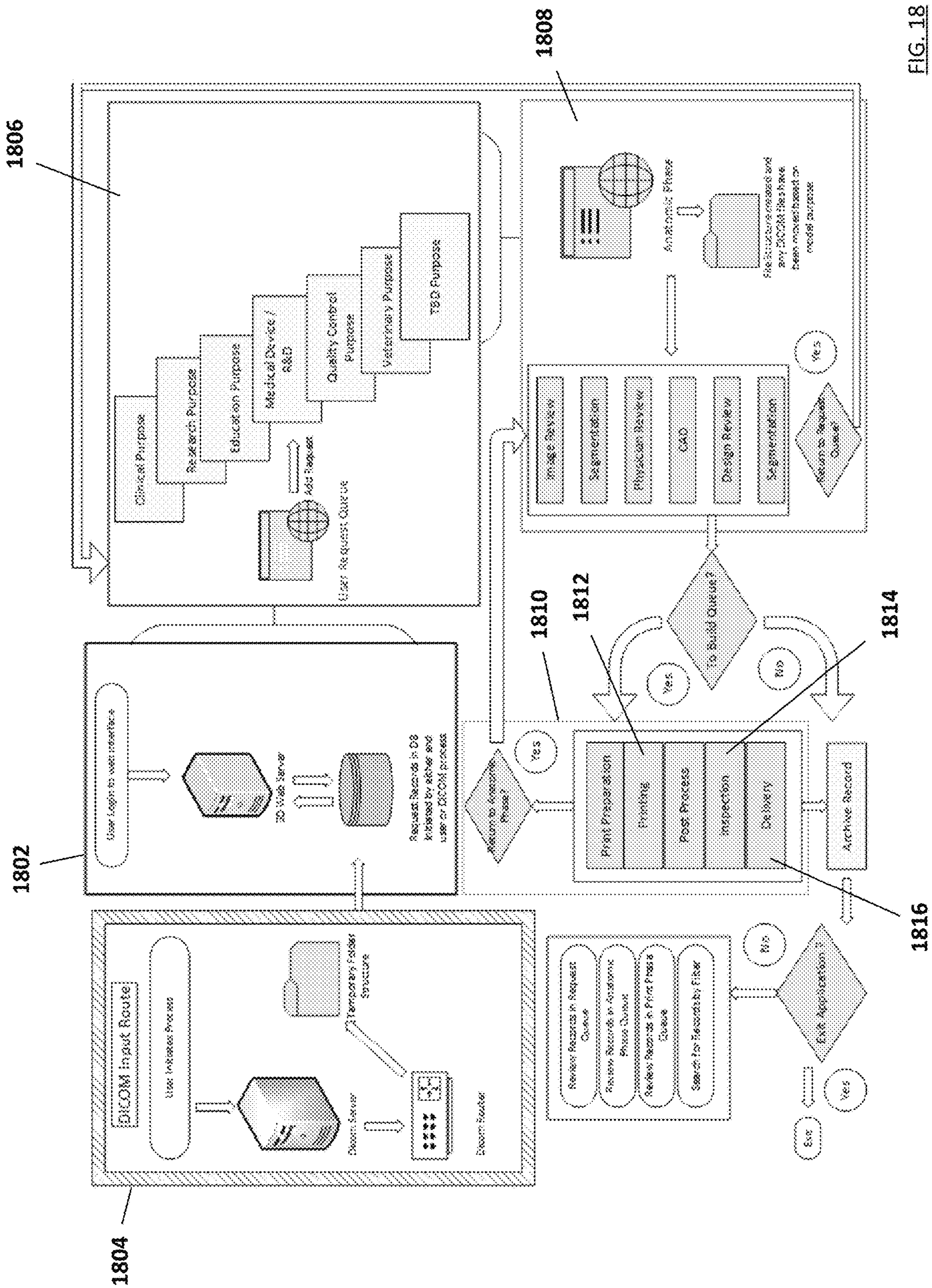
FIG. 18 incudes a combined computer architecture and process flow diagram illustrating examples of various aspects of certain embodiments of the invention.

FIG. 18 incudes a combined computer architecture and process flow diagram illustrating examples of various aspects of certain embodiments of the invention. As shown, the three-dimensional printing workflow management process can be divided into Phases and then further subdivided into Stages. The Phases correspond to incremental advancements in the production cycle, while Stages correspond to discrete processes within each Phase. As shown in section 1802, a user can initiate a session through a web-based interface, for example, to retrieve data files from an input data section 1804. The Request Queue 1806 can be accessed and used to enter the Anatomic Modeling Phase shown at section 1808. The Build Phase receives information related to the modeling process at section 1810, and the Object or device can be printed at step 1812. The inspection and delivery processes for the printed Object can then be completed at steps 1814, 1816 (respectively). In certain embodiments, when advancing through the process, a check box can be displayed at the top of each Stage allowing the user to "Set as Current Stage" (corresponds to card location in Kanban view), resulting in the cell turning from gray to yellow to denote the Stage has been initiated.

As described above, the Request Queue is where a request is created, updated, and completed (unique because records here have not yet begun the manufacturing process). The Anatomic Phase is where medical imaging is turned into a 3D Object; can be comprised of Order Entry, Image Review, Segmentation, Physician Review, CAD, Design Review, and/or Print Queue Stages. The Build Phase is where digital 3D Objects are manufactured into physical 3D Objects; comprised of Print Preparation (Print Prep), Printing, and Post-Processing Stages. The Inspection/Delivery Phase is where Objects and their associated parts are inspected and delivered to the Requesting Client; can comprise Inspection and Delivery Stages.

Figure 19:
FIG. 19 includes an example of a user interface screen illustrating an overview of the Request Queue.

FIG. 19 includes an example of a user interface screen illustrating an overview of the Request Queue. Requests can be generated in multiple unique ways. The first is a pathway by which requests tied to medical imaging are generated through integration with electronic medical record (EMR) and radiology information system (RIS) process. This integration facilitates ease of clinical use and populates requests in the Request Queue via physicians' normal ordering methods. The process accepts standard healthcare information communication protocols (e.g., HL7) as the means of interface. Orders entered via this pathway automatically appear in the Request Queue for review by program staff. Required information such as Primary Segmentation, Secondary Segmentation, Site, etc., can be automatically populated based on stored information for a combination of requestor and anatomy, completing the request. A second pathway is necessitated by non-clinical requests (not tied to a patient or medical imaging) and is initiated via a web-based form that prospective clients may fill out with information regarding their needs. The fields on this form are unique to the request type and correspond to required fields within the process. Once the form is completed and submitted by the prospective client, a corresponding request is generated in the Request Queue for review and completion by program staff. A third pathway is less automated and is necessitated by the variety of request types that may not be tied to medical imaging studies or a request form. This method is semi-automated and requires manual selection of Model Purpose, Imaging Type, and Model Definition. Once these fields are defined, required information (determined by complex conditional logic) can be entered to complete the request. Additionally, if a request is made for a model or Object which is tied to medical imaging, the record can be created by selecting the appropriate Model Purpose, Imaging Type, and Model Definition and entering the patient's first name, last name, and date of birth. Subsequently, the user should select the checkbox for "Create Directories on File Share." Once the relevant imaging is available, images can be communicated to a relevant imaging vault (tied to this process) and the record can automatically complete relevant patient-data fields and save the images in the imaging folder. Then the other required fields can be entered to complete the request. Once a record is complete (all required fields are filled), the user can select the "Send to Anatomic" check box and pass the record to the Anatomic Phase. Additionally, at any time, the request can be deleted from the queue if the requested Object is no longer needed or does not have the appropriate prerequisites.

Figure 20:
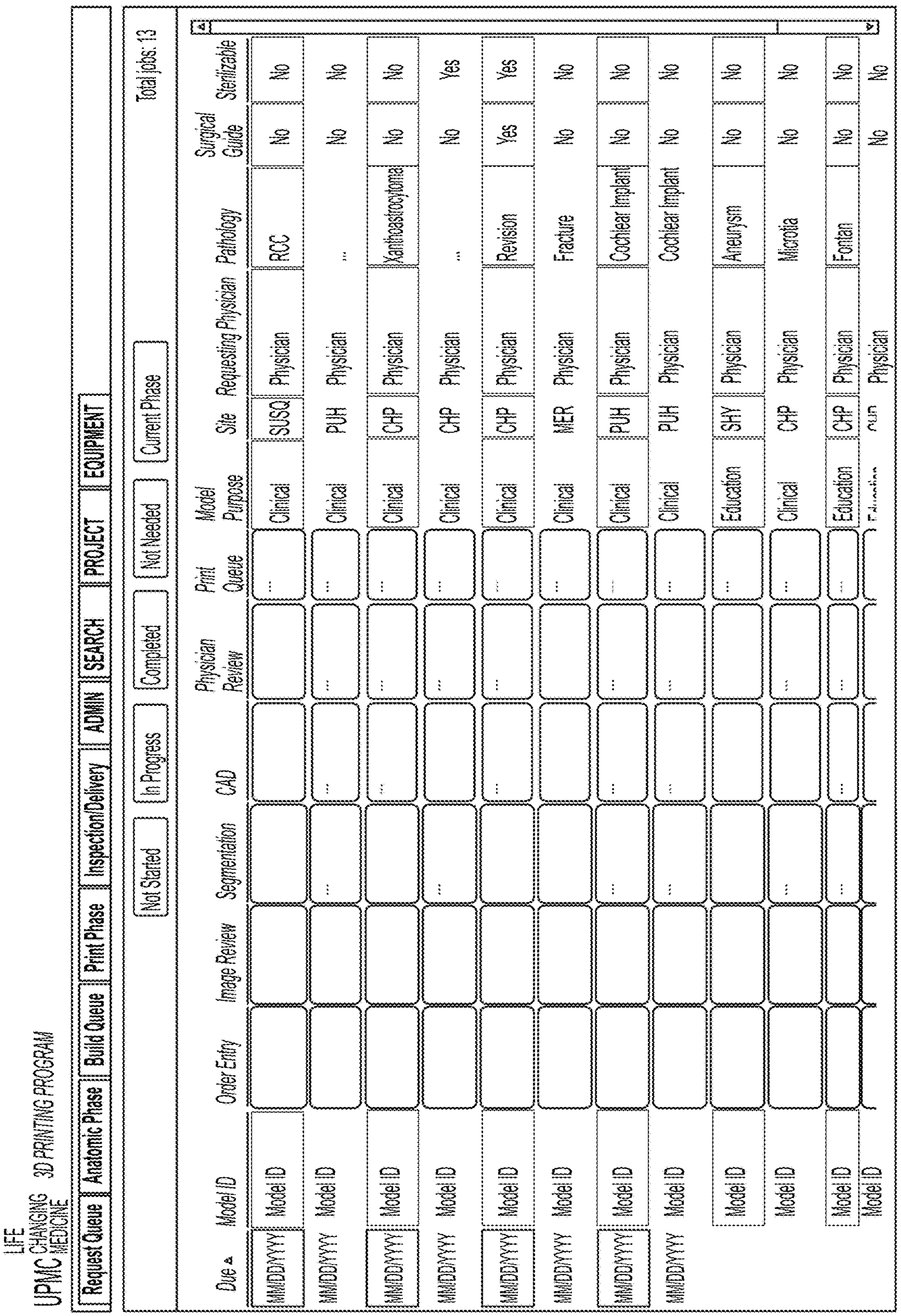
FIG. 20 includes an example of a user interface screen illustrating an overview of the Anatomic Phase or Anatomic Modeling Phase.

FIG. 20 includes an example of a user interface screen illustrating an overview of the Anatomic Phase or Anatomic Modeling Phase. By selecting the Anatomic Phase Tab at the top of the screen, the user is presented with all records currently in the Anatomic Phase and can see their statuses. In this view, the user can choose to see each record and Phase Stages in a table format or Kanban-style view. Additionally, to navigate to a specific Stage of an Object's production process, the user can click on the box (cell) in the array that corresponds to the desired Model ID and Stage. Each cell is color-coded to denote progress: gray is "not needed", yellow is "in progress", green is "completed", and white represents "hasn't been started". If necessary, the record can be sent back to the Request Phase for editing.

Figure 21:
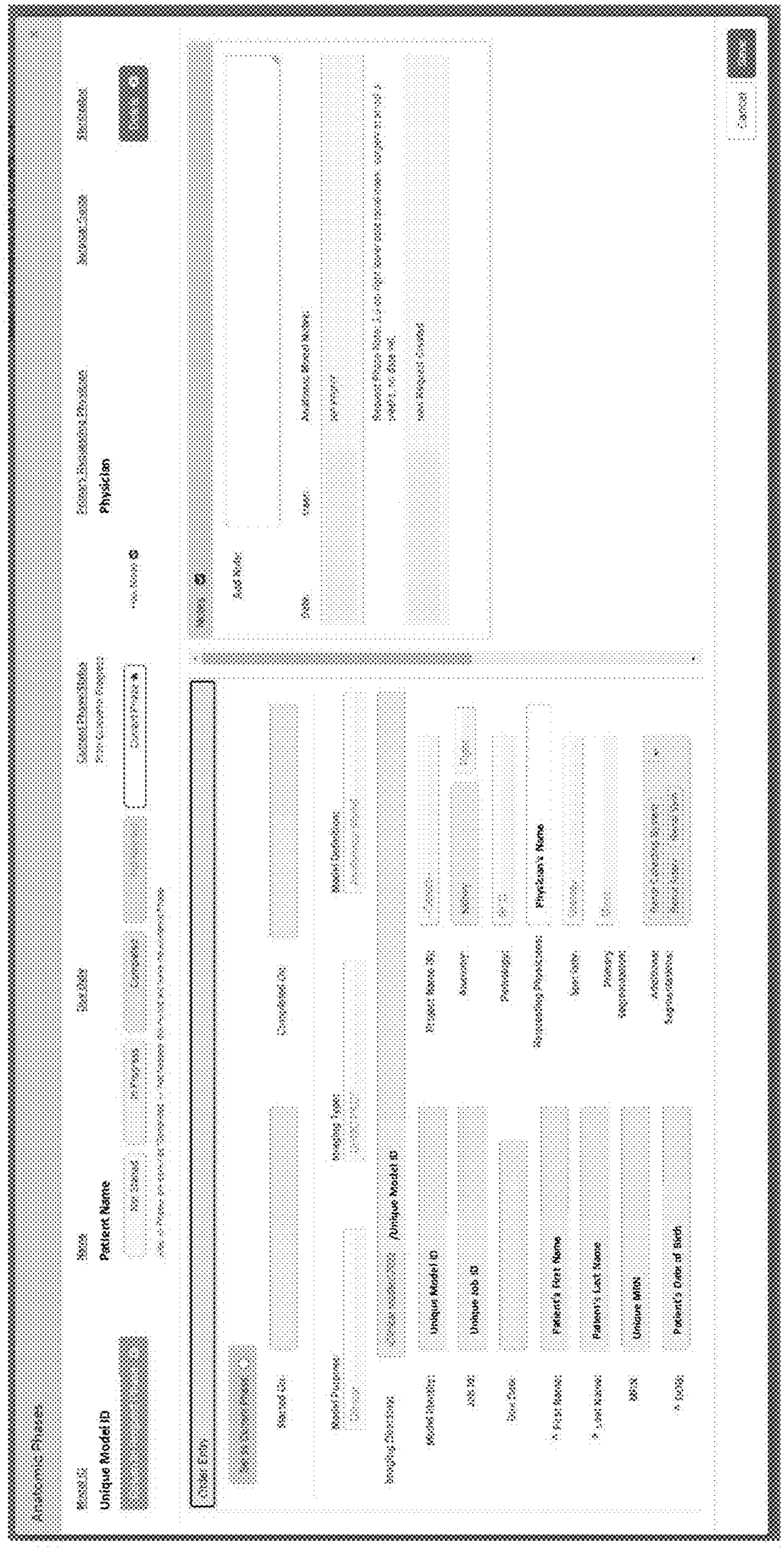
FIG. 21 includes an example of a user interface screen illustrating an overview of the Order Entry Stage.

FIG. 21 includes an example of a user interface screen illustrating an overview of the Order Entry Stage. This Stage is used to display the name of the user responsible for forwarding the record from the Request Queue and records the date on which the record was moved to the Anatomic Phase.

Figure 22:
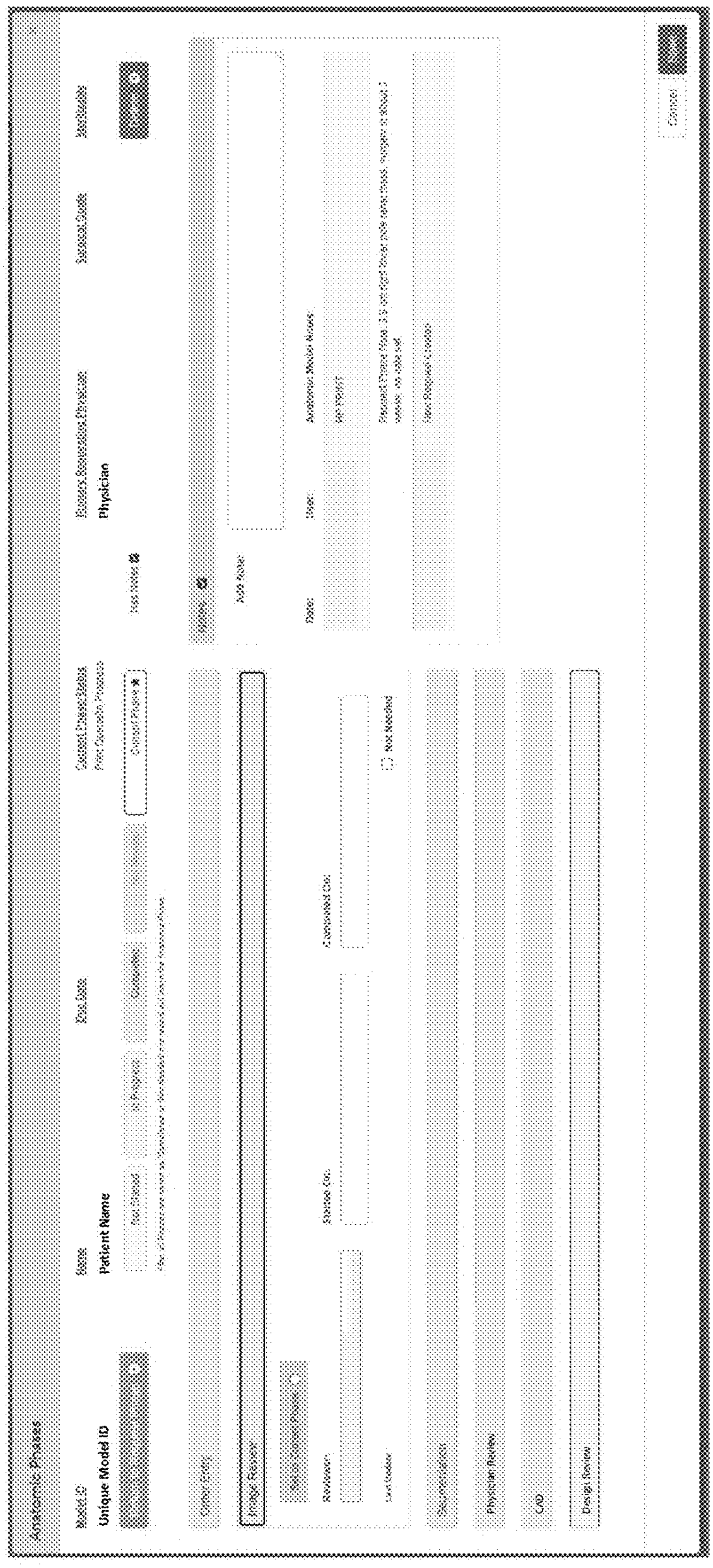
FIG. 22 includes an example of a user interface screen illustrating an overview of the Image Review Stage.

FIG. 22 includes an example of a user interface screen illustrating an overview of the Image Review Stage. A user can click on the Model ID link from the list in the Anatomic Phase and select the header "Image Review" to view the information tracked within this Stage. The user can then enter the name of the staff member who reviewed the images for a clinical request from the "Reviewer" dropdown list (managed in the Admin Tab). Then the user can record the "Started On" and "Completed On" dates before this Stage is considered complete, and the record can be moved to the next Stage. If Image Review is not desired or necessary, then the user can select the checkbox for "Not Needed", which will result in the cell being grayed-out and the fields becoming inaccessible. If necessary, the record can be sent back to the Request Phase or any previous Stage in the Anatomic Phase to be edited.

Figure 23:
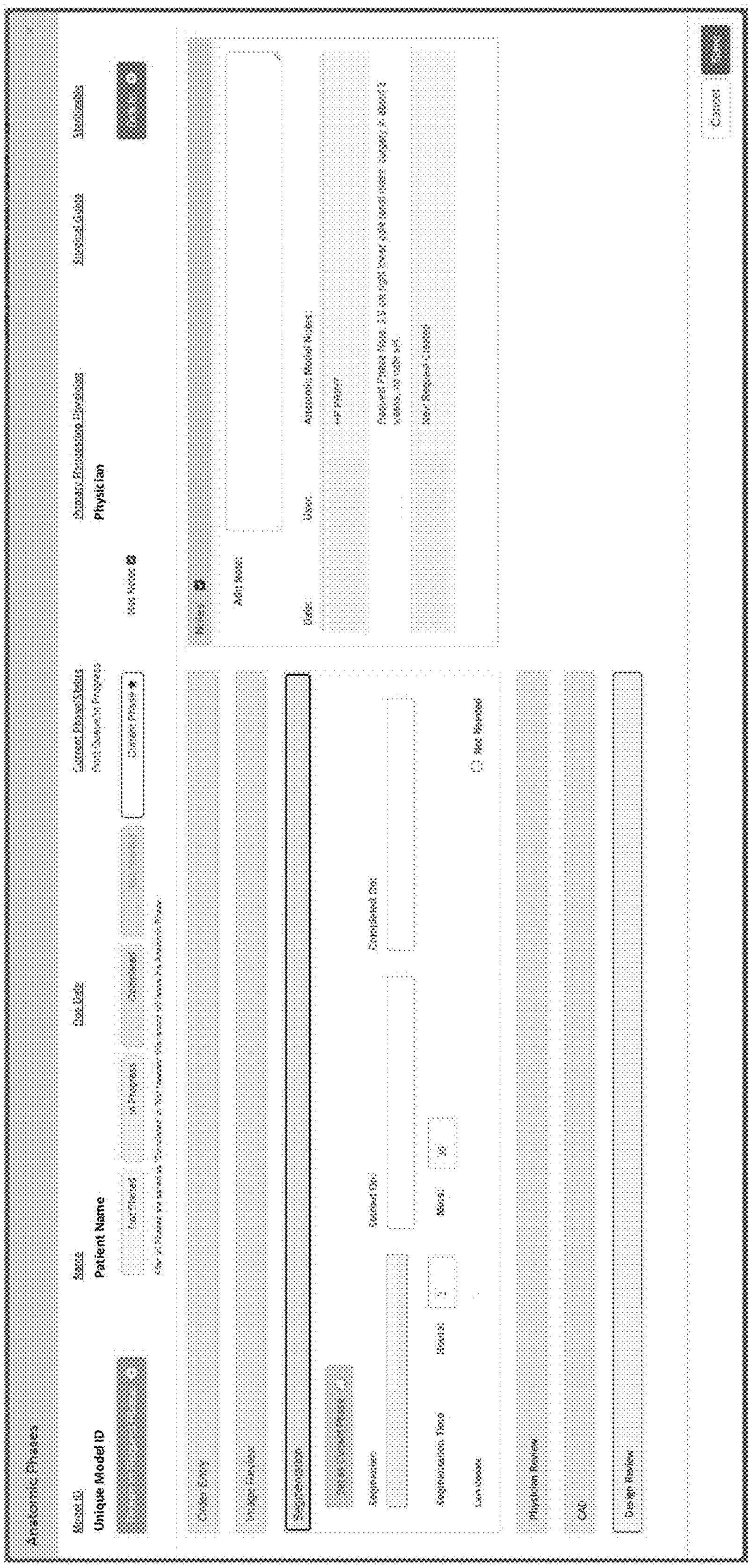
FIG. 23 includes an example of a user interface screen illustrating an overview of the Segmentation Stage.

FIG. 23 includes an example of a user interface screen illustrating an overview of the Segmentation Stage. In this Stage, the staff member conducting the segmentation (if necessary) will be required to select their name from the "Segmenter" dropdown list (managed in the Admin Tab). Additionally, the user can enter the "Started On" and "Completed On" dates, as well as the time (hours and minutes) spent segmenting. If Segmentation isn't needed, the user can select the checkbox for "Not Needed", which will result in the Stage being grayed-out and the fields becoming inaccessible. If necessary, the record can be sent back to the Request Phase or any previous Stage in the Anatomic Phase to be edited.

Figure 24:
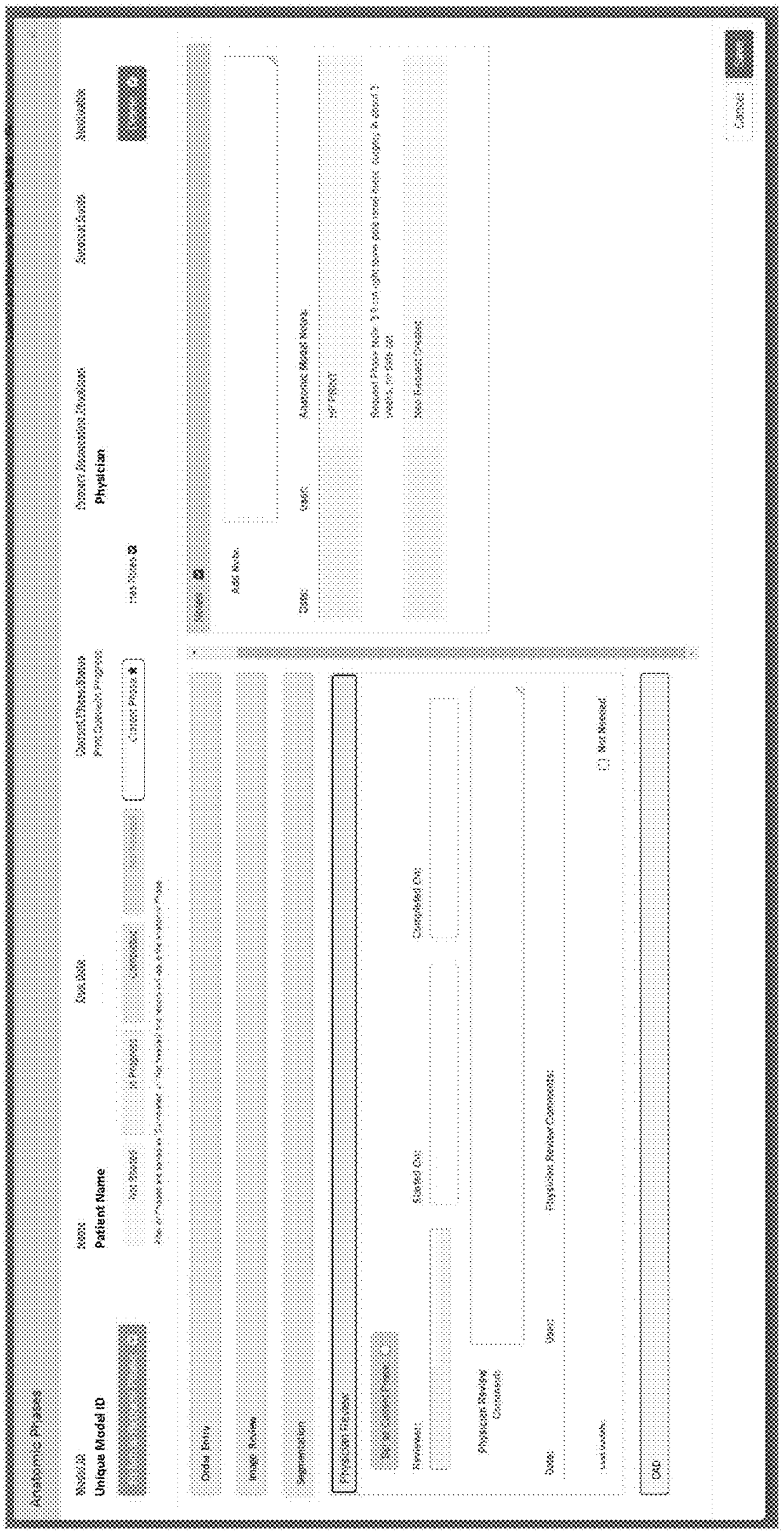
FIG. 24 includes an example of a user interface screen illustrating an overview of the Physician Review Stage.

FIG. 24 includes an example of a user interface screen illustrating an overview of the Physician Review Stage. In this Stage, a subspecialty radiologist or equally qualified segmentation reviewer, shall complete the required fields. The name of the reviewer is recorded by selecting the reviewer's name from the "Reviewer" dropdown list (managed in the Admin Tab) and recording the "Started On" and "Completed On" dates. Additionally, there is a free text entry field for "Comments" that can be used to record any notable findings during the review that can be communicated to the Segmenter. If the record can be sent back to the Segmentation Stage, the record's corresponding cell will turn red, alerting the Segmenter that changes are required. If necessary, the record can be sent back to the Request Phase or any previous Stage in the Anatomic Phase to be edited.

Figure 25:
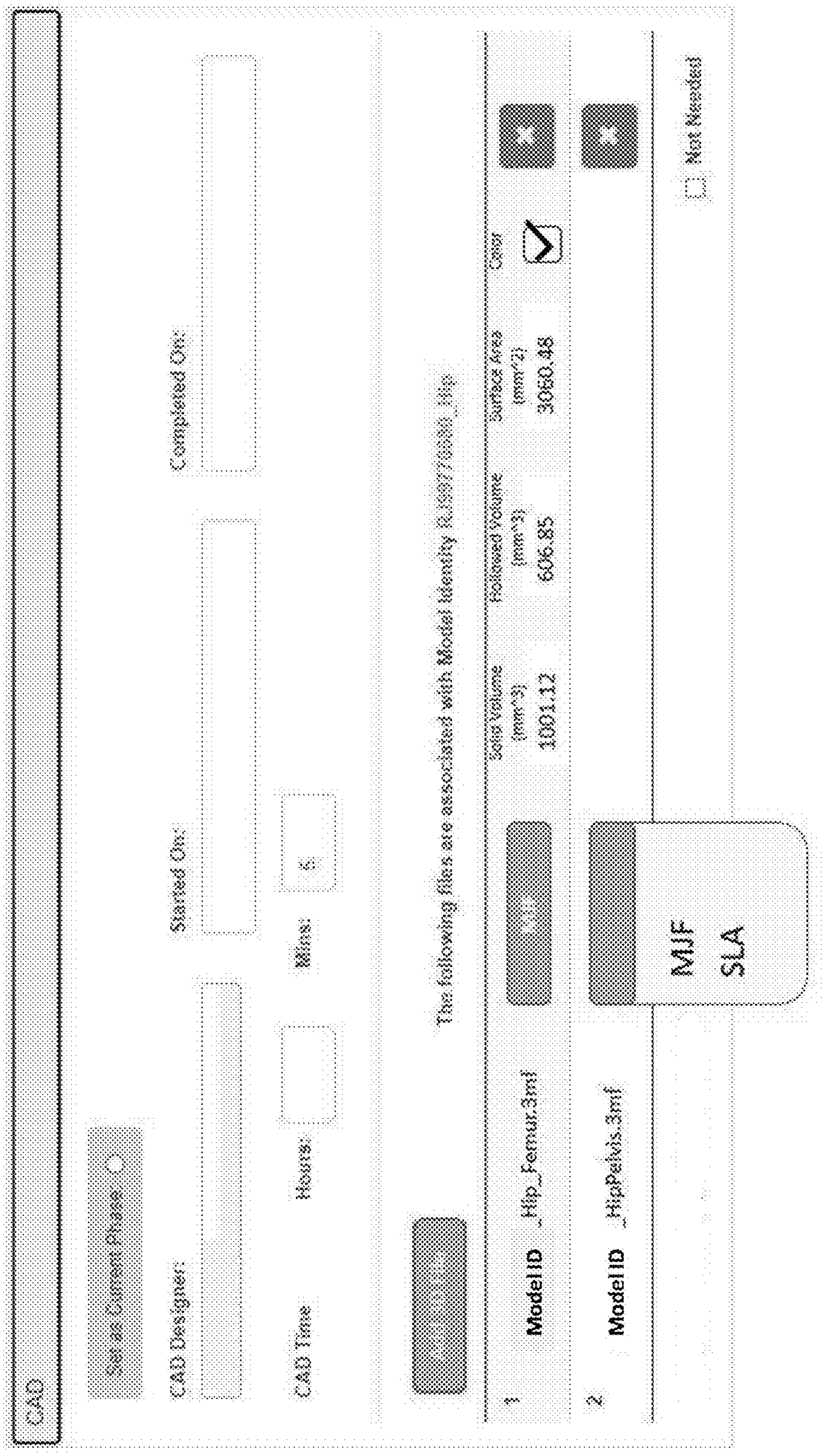
FIG. 25 includes an example of a user interface screen illustrating an overview of the Computer-Aided Design (CAD) Stage.

FIG. 25 includes an example of a user interface screen illustrating an overview of the Computer-Aided Design (CAD) Stage. In this Stage, the staff member conducting the CAD operations will record their name, by selecting it from the "CAD Designer" dropdown list (managed in the Admin Tab) and can complete the "Started On" and "Completed On" date entry fields. Additionally, 3D files generated for the request can be recorded here, and each file can be assigned to the technology required to print it (e.g., stereolithography (SLA), fused deposition (FDM), material jetting (MJF), etc.) via a dropdown list (managed in the Admin Tab). Depending on the printing modality assigned, the user will also be required to record specific volume and surface area information pertinent to cost calculation. Furthermore, there are modality specific options that appear in this Stage that correspond to the assigned printing technology. For example, a 3D file assigned to MJF will also have a checkbox to indicate whether the Object should be printed in color. The selection of printing technology and recorded information from this Stage can be leveraged in the Build Phase for assembling Builds and assigning an Object or multiple Objects to a specific printer.

Figure 26:
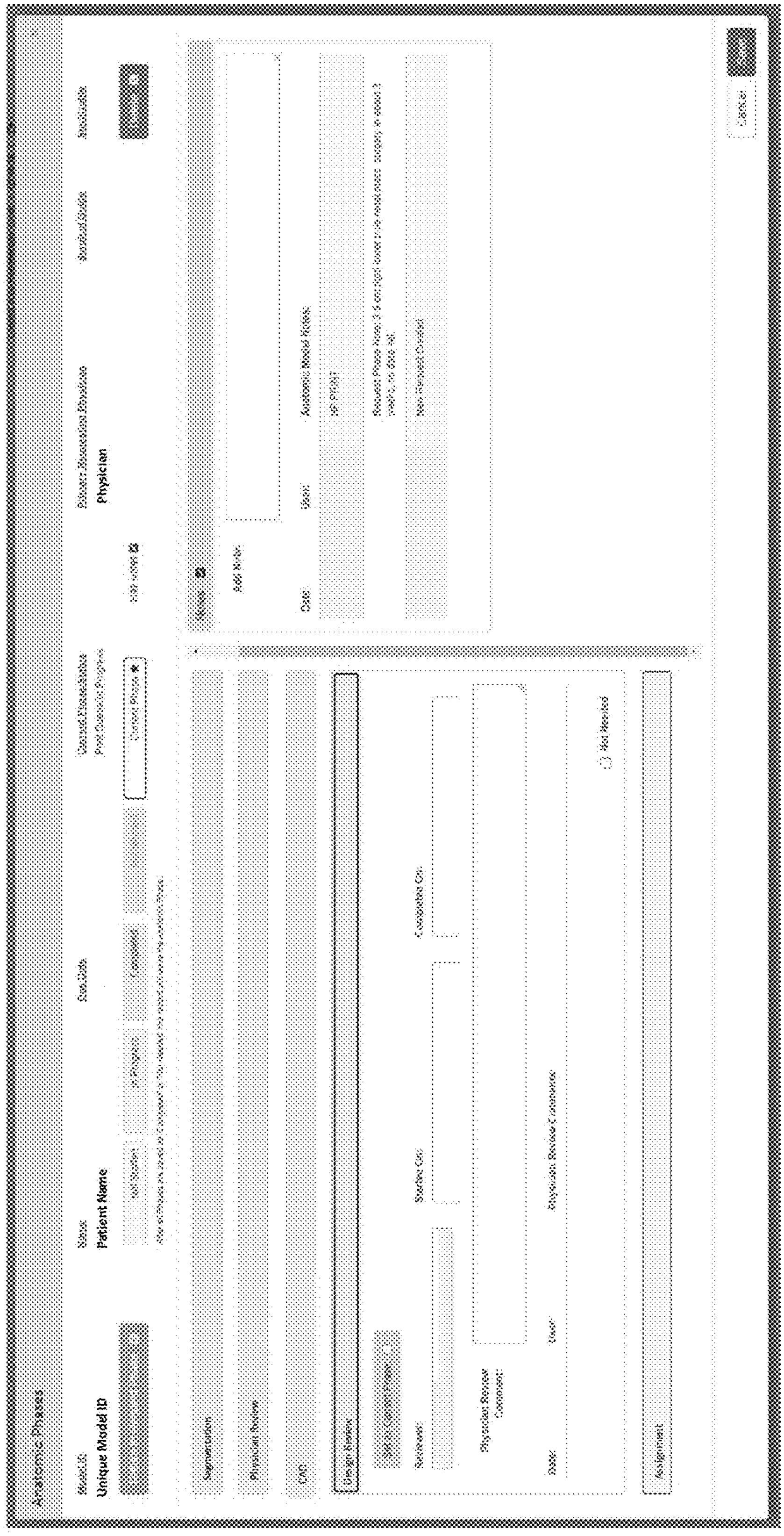
FIG. 26 includes an example of a user interface screen illustrating an overview of the Design Review Stage.

FIG. 26 includes an example of a user interface screen illustrating an overview of the Design Review Stage. In this Stage, a more senior engineer or equally qualified staff member shall complete the required fields. The name of the reviewer is recorded by selecting the reviewer's name from the "Reviewer" dropdown list (managed in the Admin Tab) and recording the "Started On" and "Completed On" dates. Additionally, a free text entry field for "Comments" can be used to record any notable findings made during the review that can be communicated to the individual who conducted the CAD. If the record can be sent back to the CAD Stage, the record's corresponding cell will turn red, alerting the Designer that changes are required. If necessary, the record can be sent back to the Request Phase or any previous Stage in the Anatomic Phase to be edited.

Figure 27:
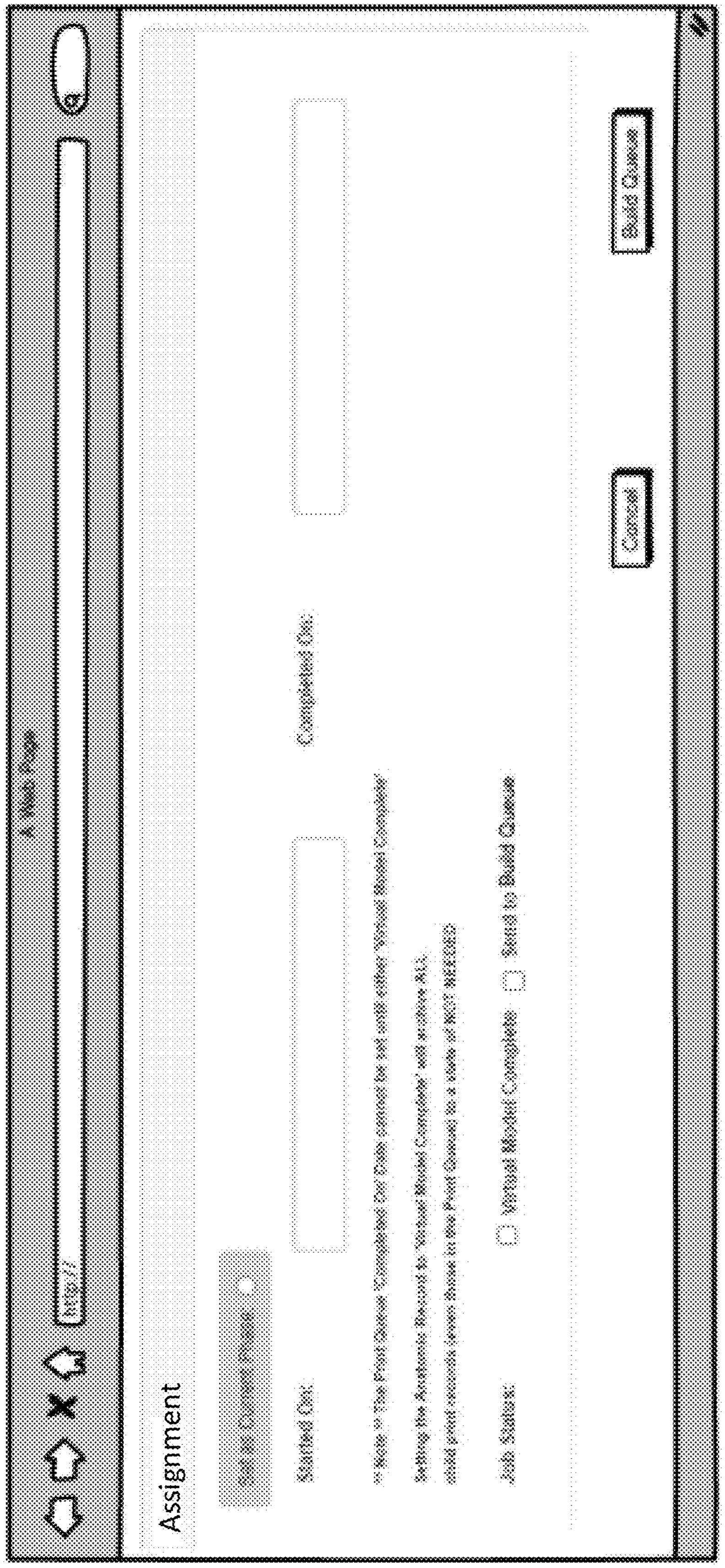
FIG. 27 includes an example of a user interface screen illustrating an overview of the Assignment Stage.

FIG. 27 includes an example of a user interface screen illustrating an overview of the Assignment Stage. In this Stage, the user will determine if the Model ID is to be manufactured or if a virtual model is all that is required. This Stage may present the user with two checkboxes: "Virtual Model Complete" or "Send to Build Queue". The "Started On" and "Completed On" dates are also recorded. Furthermore, if "Virtual Model Complete" is selected, the record can be marked as completed and archived. If "Send to Build Queue" is selected, the record progresses to the next Phase of the manufacturing process. This action activates a complex set of conditional logic which allows for any part of any request to be printed on any technology, while recording all pertinent information and allowing for one request to be printed across multiple printers and/or multiple technologies. Requests enter this Stage under Model ID and can be exported into the Build Phase as individual 3D files and sorted based on the printing technology selections made in the CAD Stage.

Figure 28:
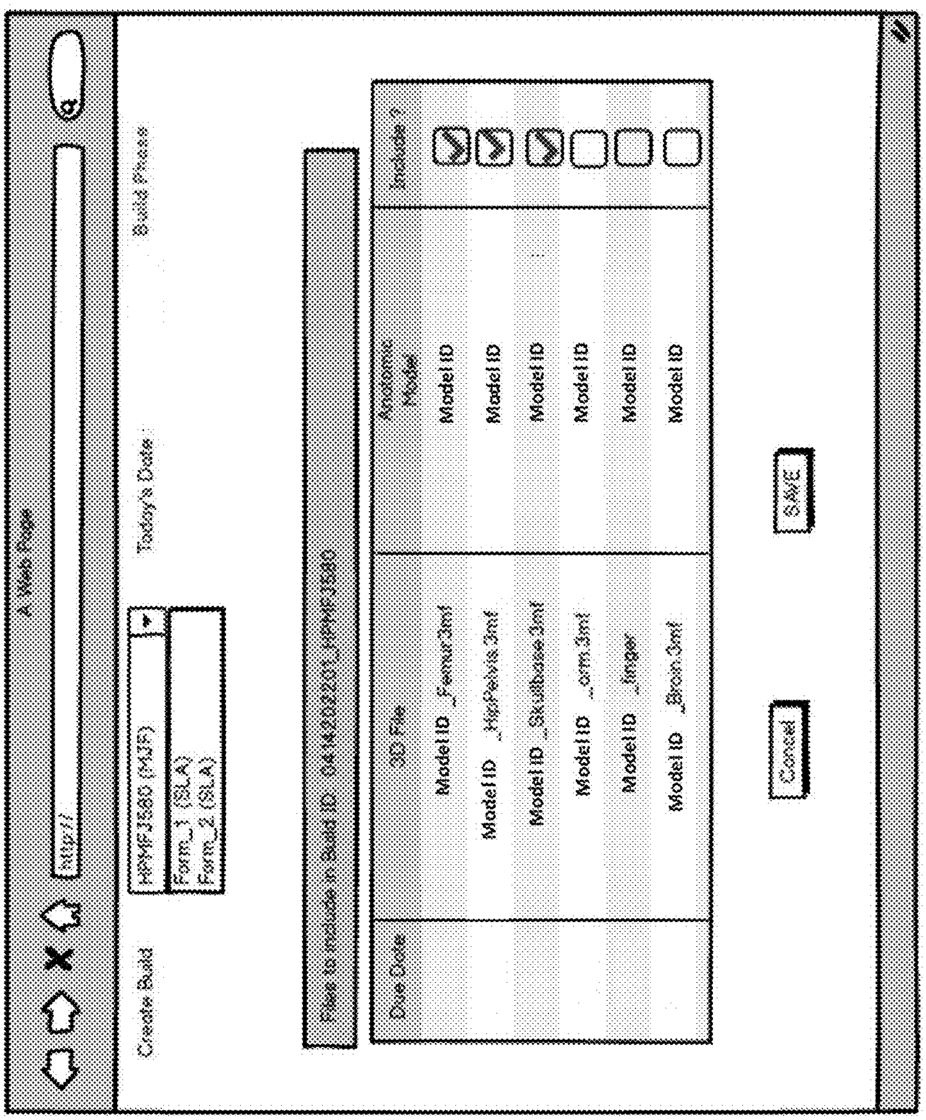
FIGS. 28 through 30 include examples of user interface screens illustrating an overview of the Build Phase.
Figure 29:
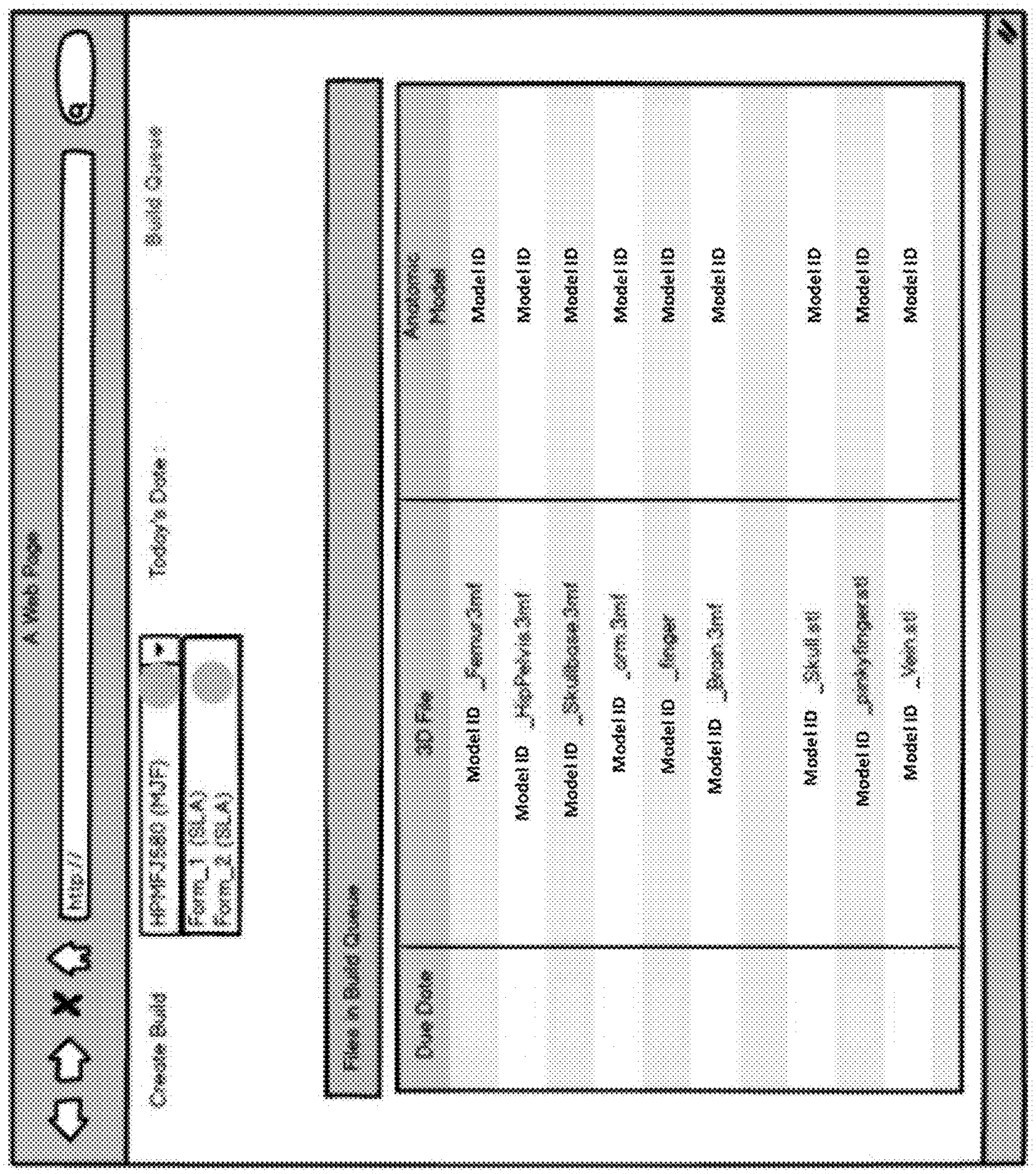
Figure 30:
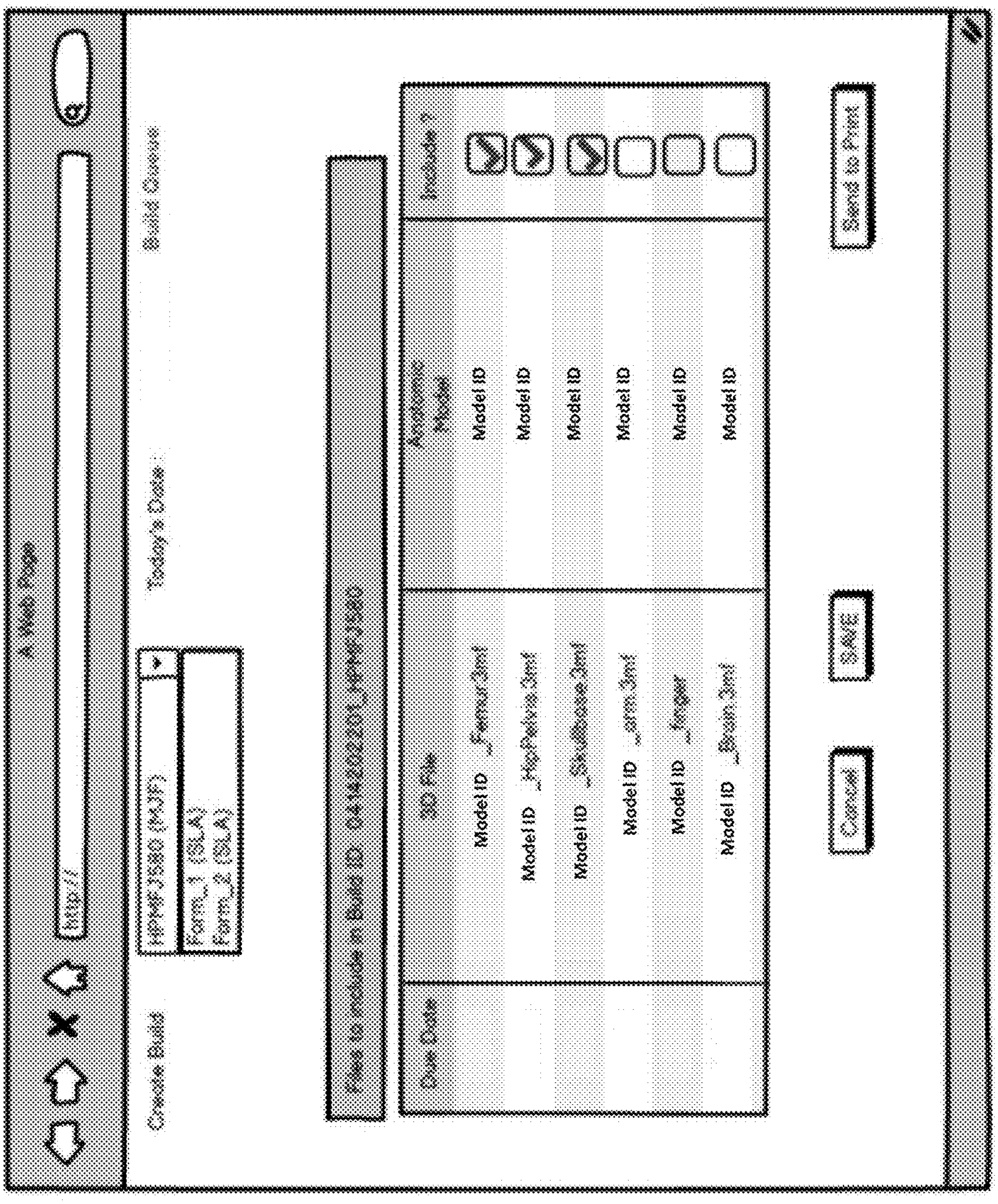

FIGS. 28 through 30 include examples of user interface screens illustrating an overview of the Build Phase. In this Phase, the user assembles 3D file(s) that are to be printed at the same time on the same printer. To accomplish this, the user will be presented first with a Table of all the individual 3D files that are available to be printed in a Table containing their due dates, file names, and associated Model IDs. To begin creating a Build, the user selects the Printing modality (e.g., SLA, FDM, MJF, etc.). This action will filter the original list down to only the files that were assigned to that printing technology during the CAD Stage and a checkbox will appear to the right of every available file. To add a 3D file to the newly generated Build ID (created via complex conditional logic, like the Model ID creation process), the user can check its associated check box. At any time, the person(s) assembling the Build can press the "Save" button and have the record remain in an editable state in the Build Queue. When the Build contains all the files necessary, the user can transition the record to the Print Phase by pressing the "Send to Print" button.

Figure 31A:
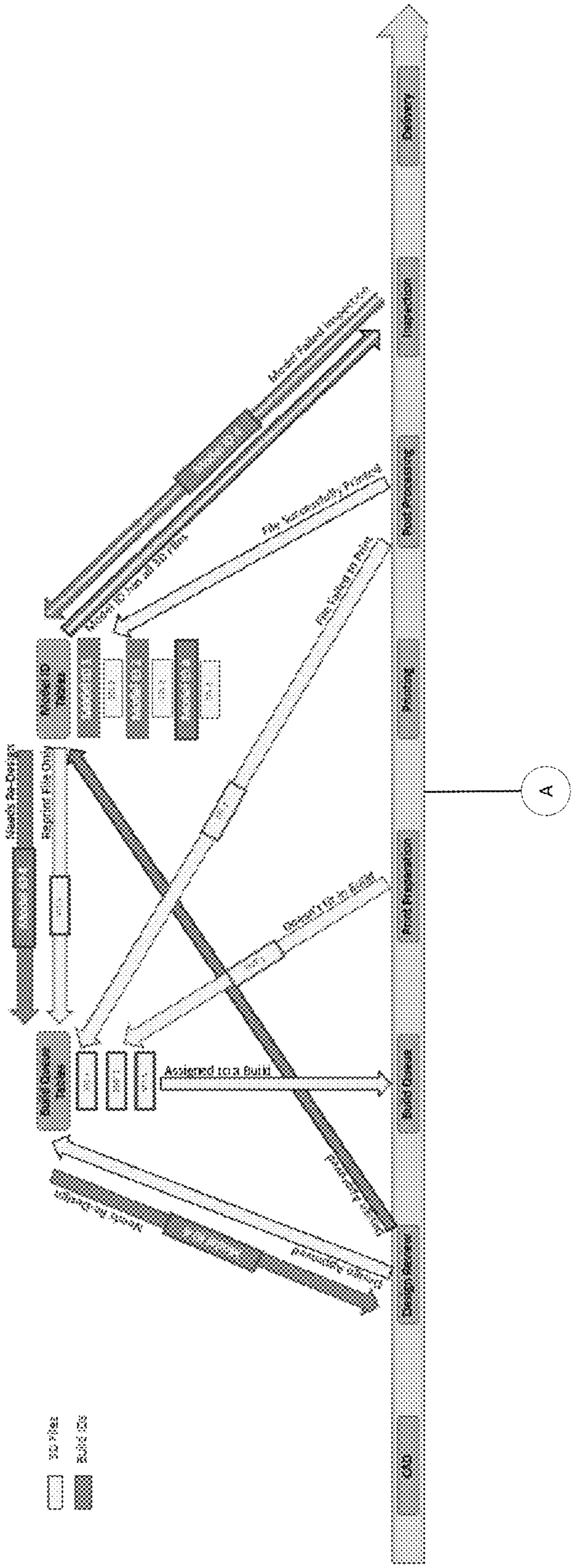
FIGS. 31A and 31B provide an overview of the computer architecture and process flow for one example of a record reverting process.
Figure 31B:
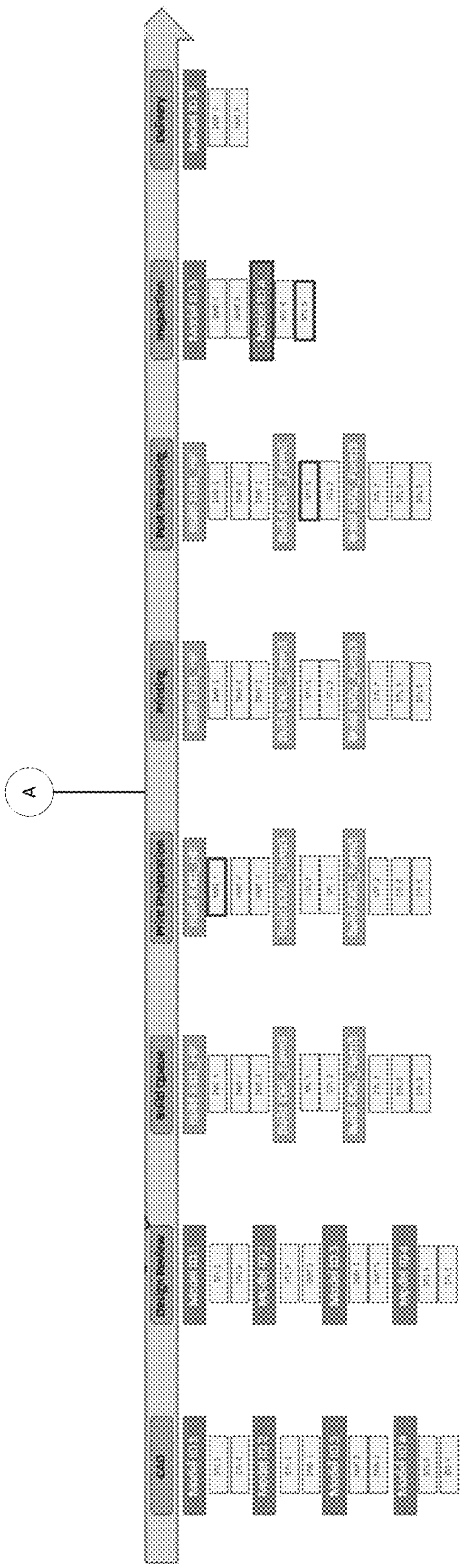
Figure 32:
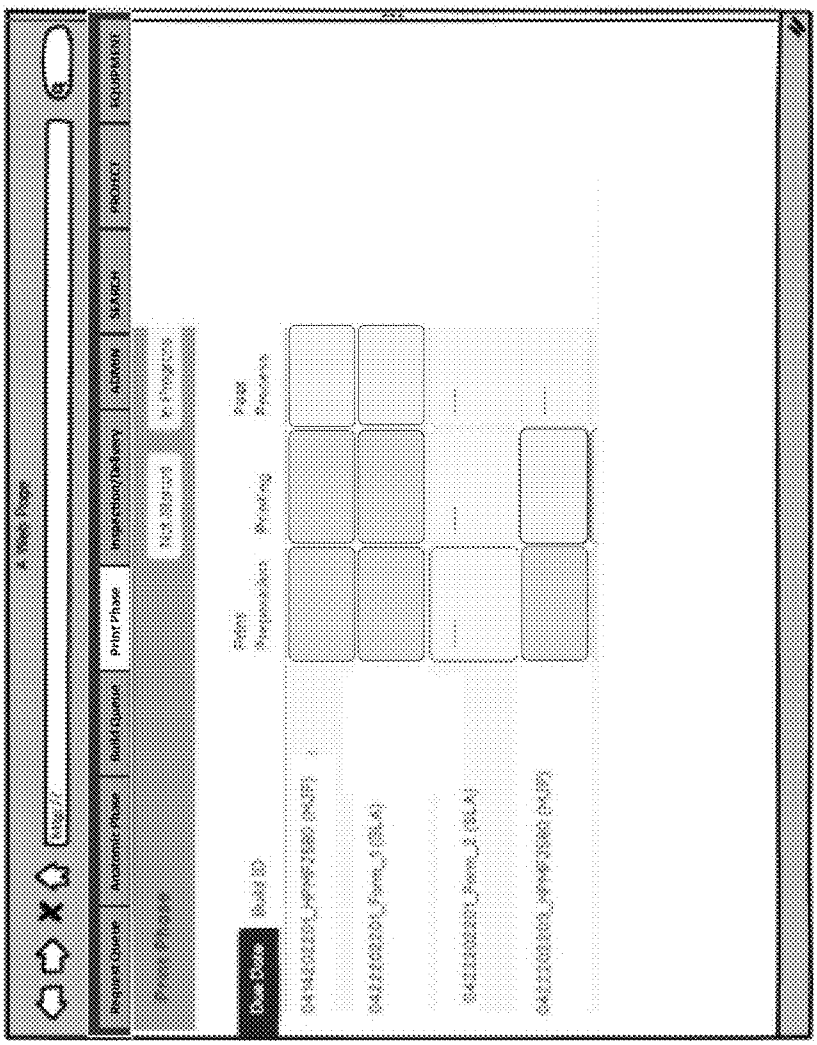
FIGS. 32 through 35 include examples of user interface screens illustrating an overview of the Print Phase.
Figure 33A:
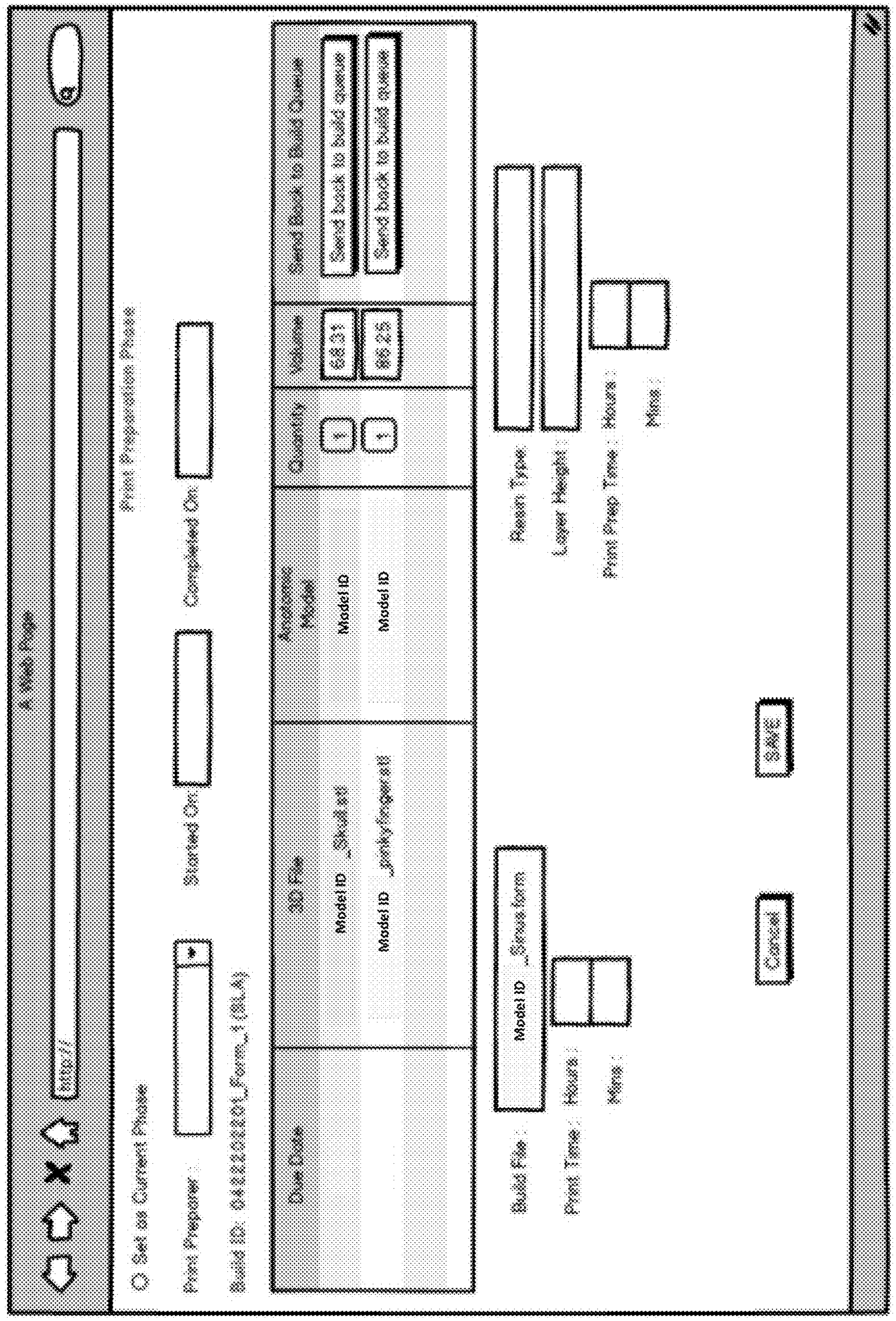
Figure 33B:
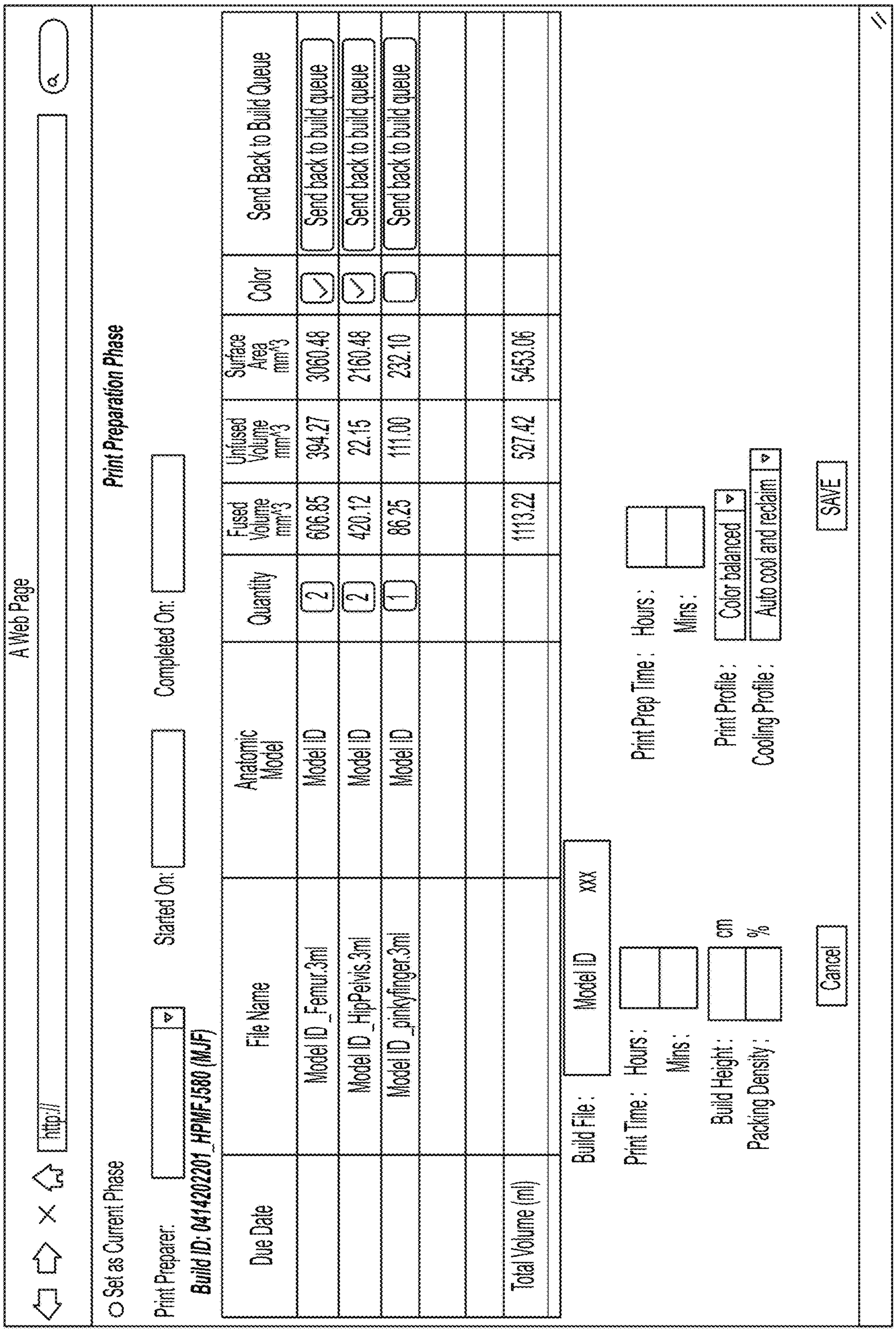
Figure 34:
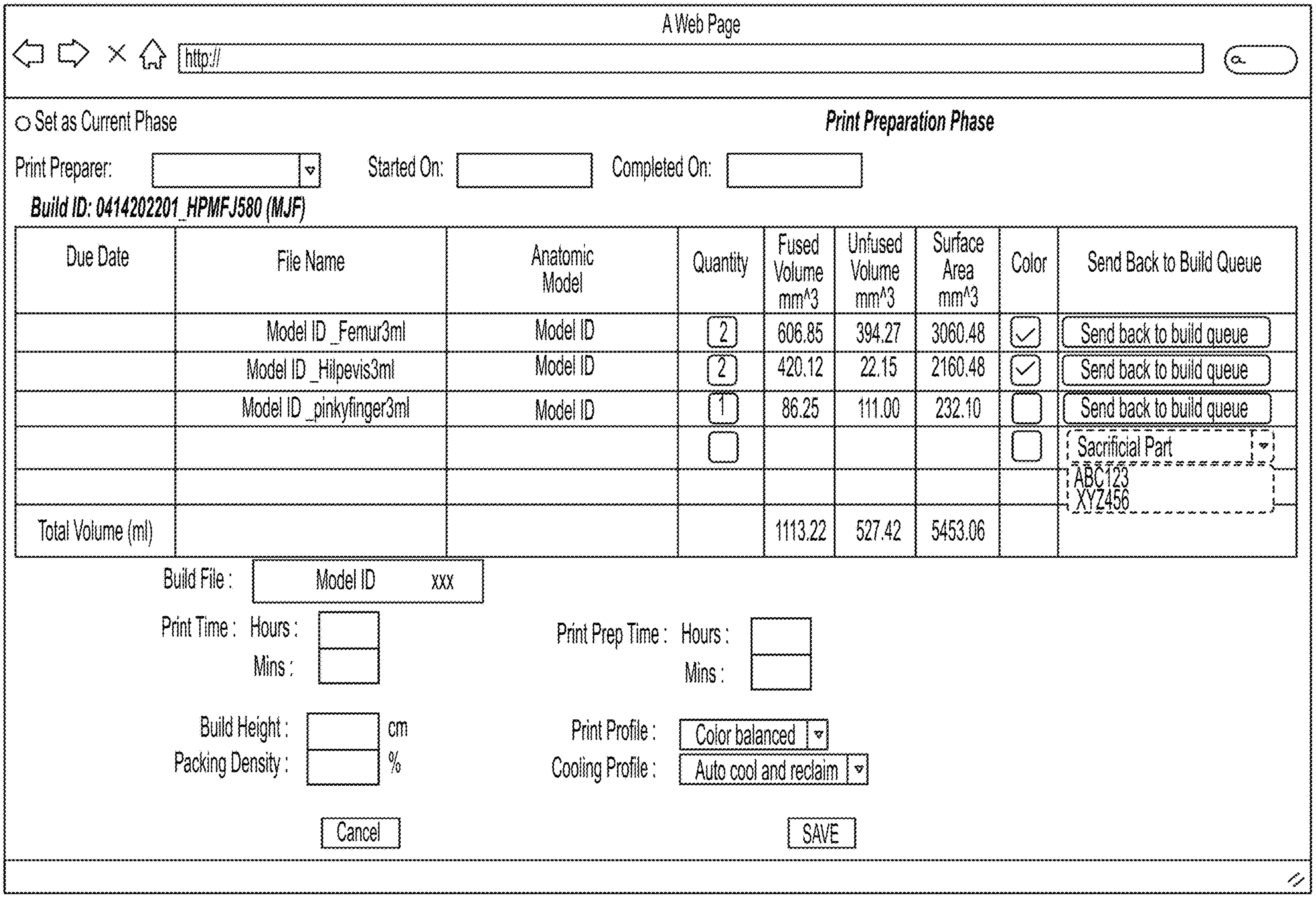
Figure 35:
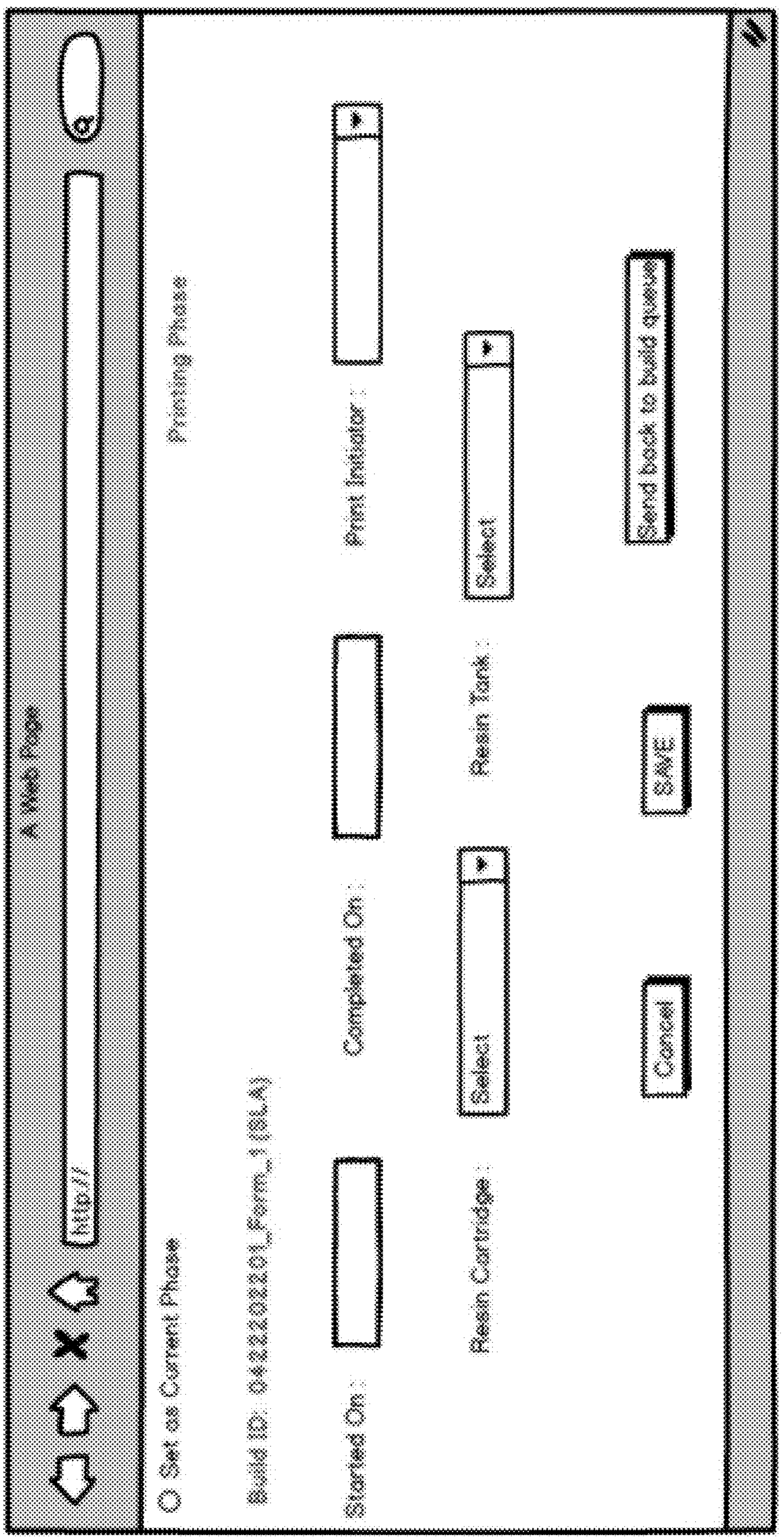

During future processing, an individual file within the Build ID or the entire Build ID may need to be reprinted. In subsequent Stages and Phases, the option exists to revert an entire Build or individual file back to the Build Queue. The file name(s) will also be appended with an "REPRINT" to denote the failure and subsequent reprint of the file to the user. This can occur if the file was reverted after the Printing Stage (i.e., during the Inspection/Delivery Phase). An overview of the computer architecture and process flow for one example of this record reverting process can be seen in FIGS. 31A and 31B.

FIGS. 32 through 35 include examples of user interface screens illustrating an overview of the Print Phase. In this Phase, the Object transitions from a virtual file to a 3D-printed Object. It is comprised of "Print Preparation", "Printing", and "Post-Processing" Stages. In the Print Preparation Stage, users can enter remaining information attributed to the Object being printed. Depending on the technology being used, the process requires different relevant information (due to complex conditional logic). For example, for MJF printing, the part volumes and surface areas are recorded in the CAD Stage because that is when the relevant information is known. For SLA printing, for example, the material/Object volumes are unknown until print preparation. Therefore, in the Print Prep Stage the fields for volume(s) and surface area for an MJF file may be read-only and copied from the CAD Stage, while the user will be required to enter the volumes for SLA files before being able to proceed. For all other existing printing technologies and in various embodiments, custom fields can be added to capture unique information. For a Build to leave this Stage, the user records the appropriate required information, including selecting the Print Preparer's name from the appropriate dropdown list (managed in the Admin Tab). The user may also be required to record a "Started On" and "Completed On" date, as well as the time it took to complete this Stage. For certain printing modalities, the addition of sacrificial parts or other repetitively printed Objects is necessary. Therefore, functionality was created which allows the user to add a sacrificial part or repetitively printed part from a dropdown list and enter the quantity to be included in a Build (see FIG.). This dropdown list, like all others, is managed in the Admin Tab and along with a filename, the relevant information (volume, surface area, etc.) can also be stored and, upon selection, can be added to and displayed in the Build. In various embodiments, the Printing Stage is customized to the printing technology to which a Build has been assigned. The user may be required to enter the "Started On" and "Completed On" dates, the name of the person that initiated the print (from the "Print Initiator" dropdown list), and any modality-specific consumable information. The relevant consumables can be selected via dropdown lists that are managed in the Admin Tab.

Figure 36:
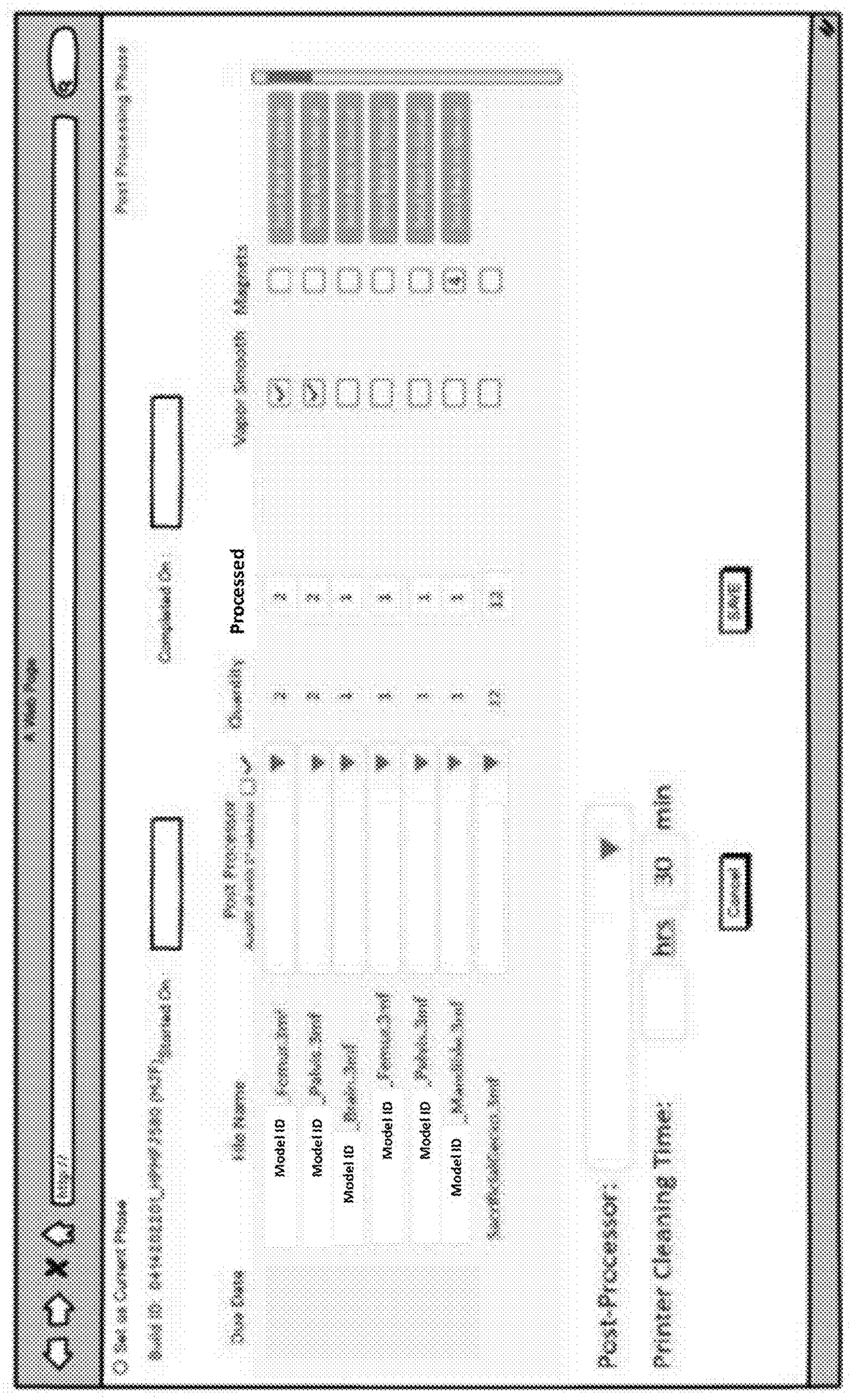
FIGS. 36 and 37 include examples of user interface screens illustrating an overview of the Post-Processing Stage.
Figure 37:
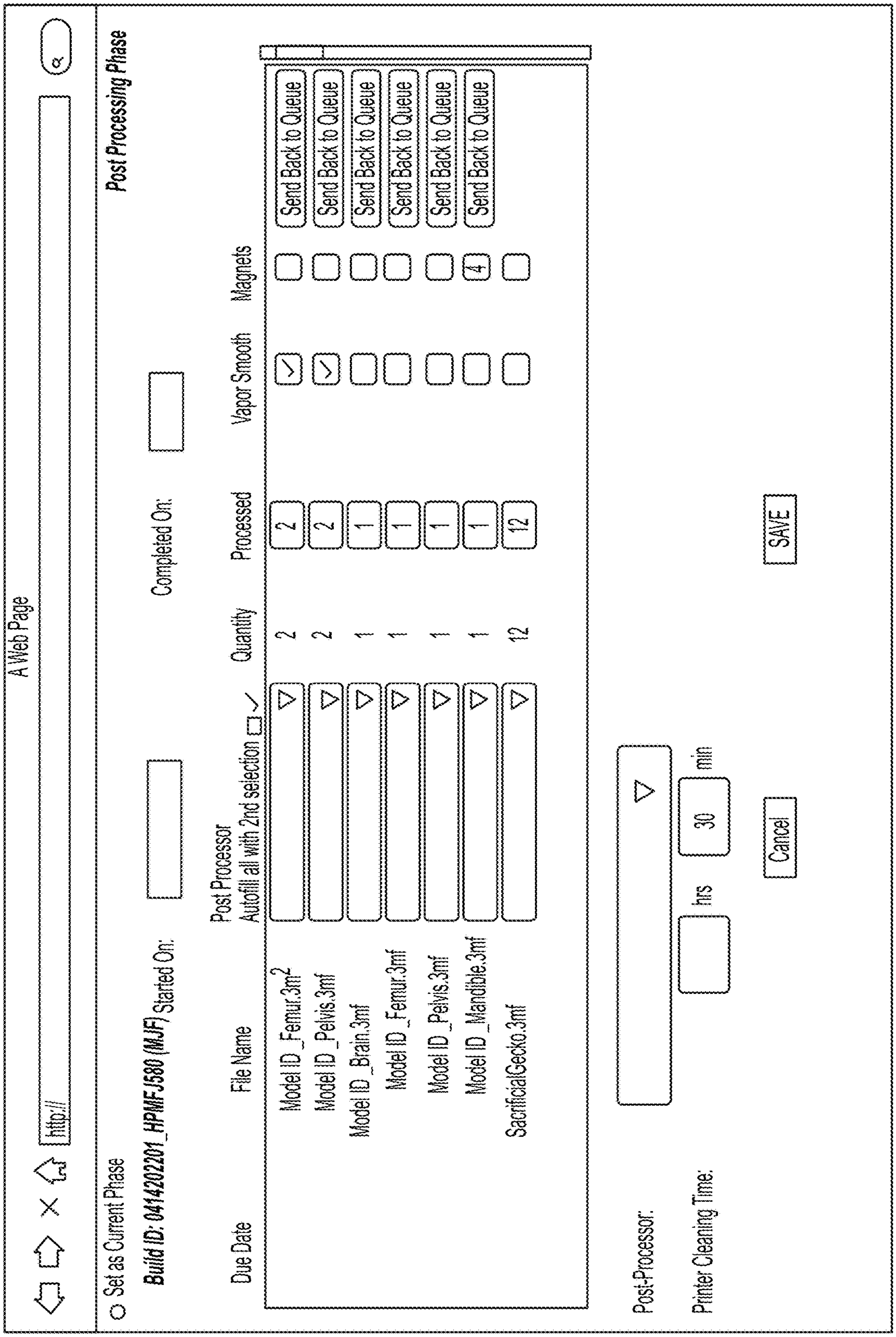
Figure 38:
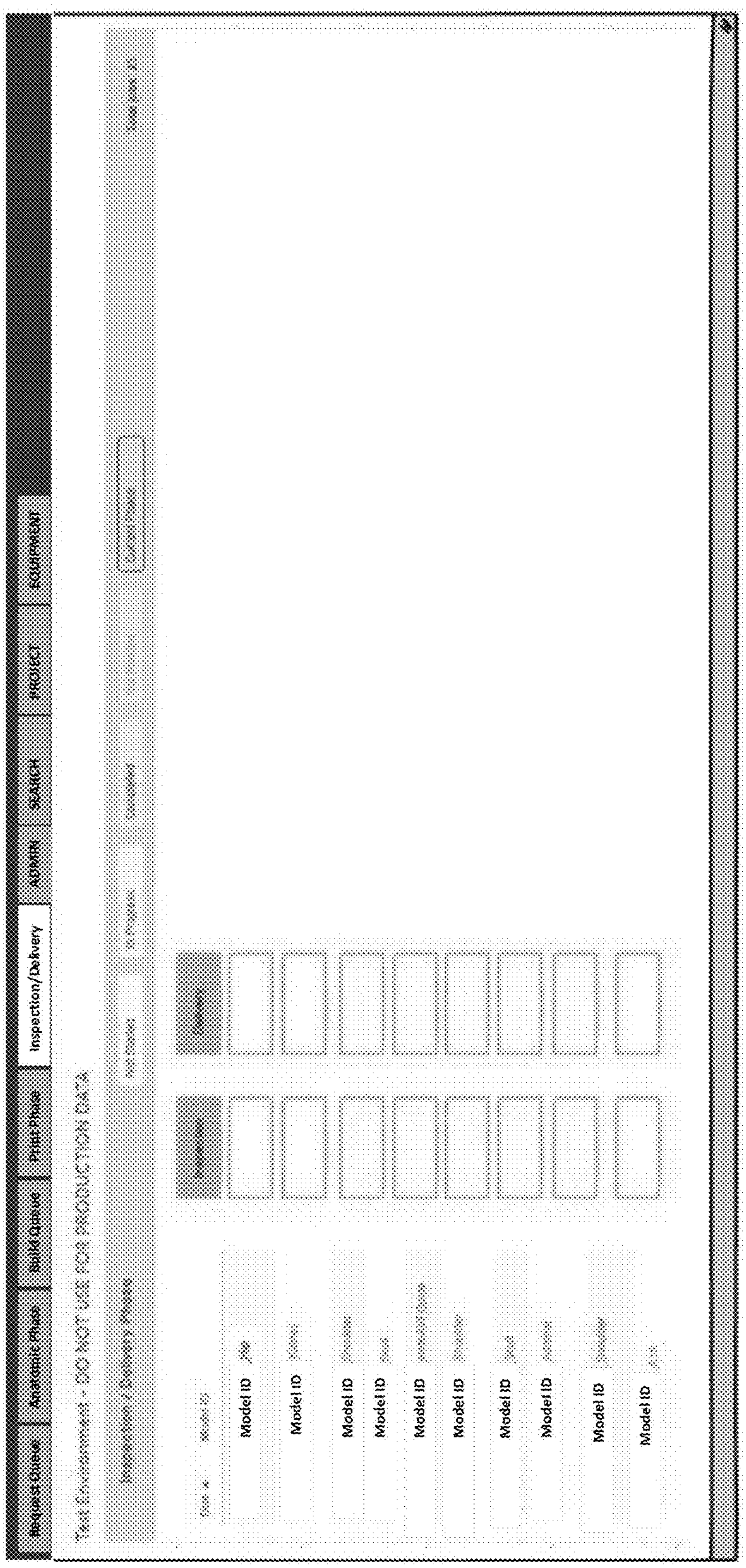
FIGS. 38 through 41 include examples of user interface screens illustrating an overview of the Inspection/Delivery Phase FIG. 42 includes an example of a user interface screen illustrating Search Tab functionality and features.
Figure 39:
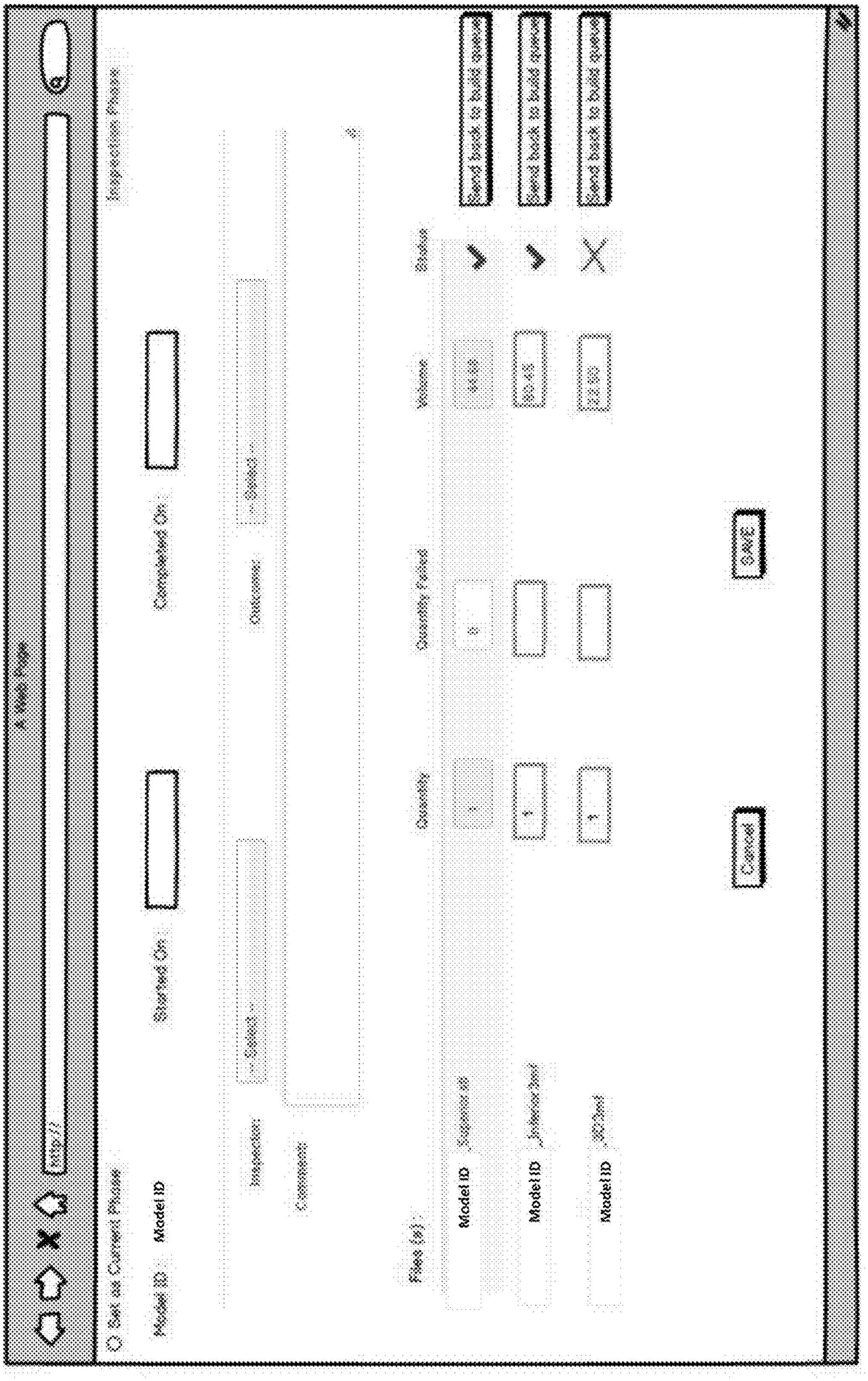
Figure 40A:
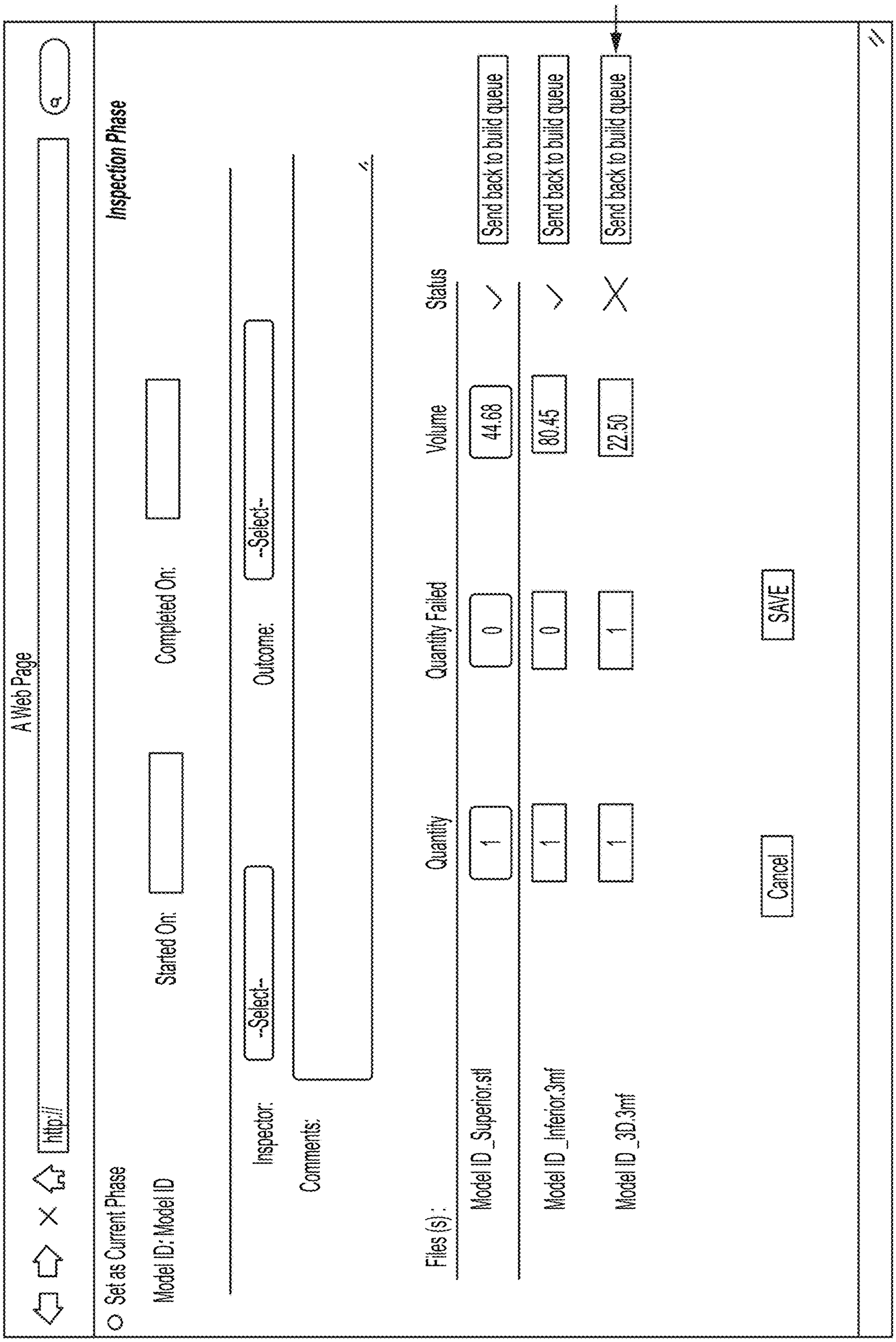
Figure 40B:
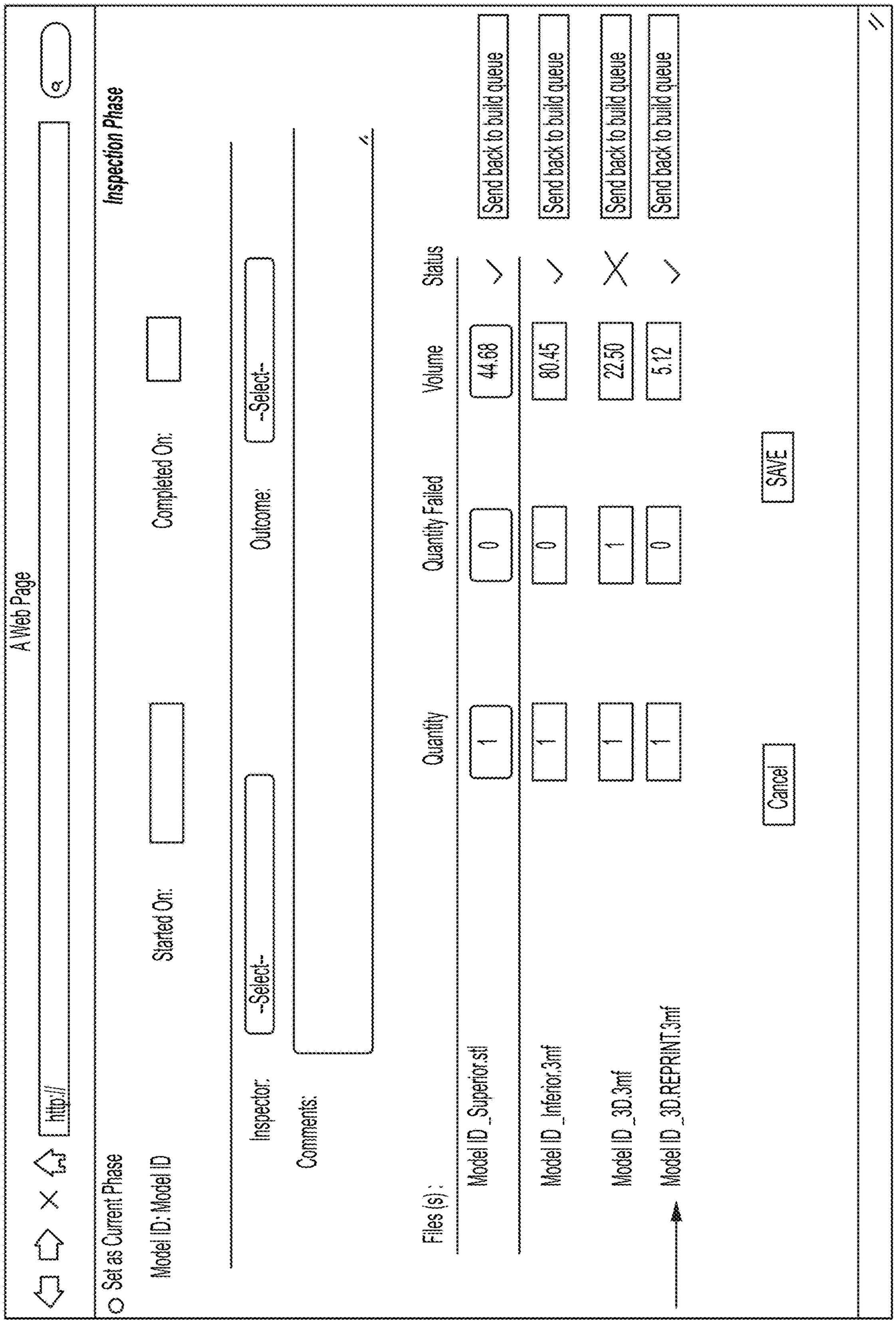
Figure 41:
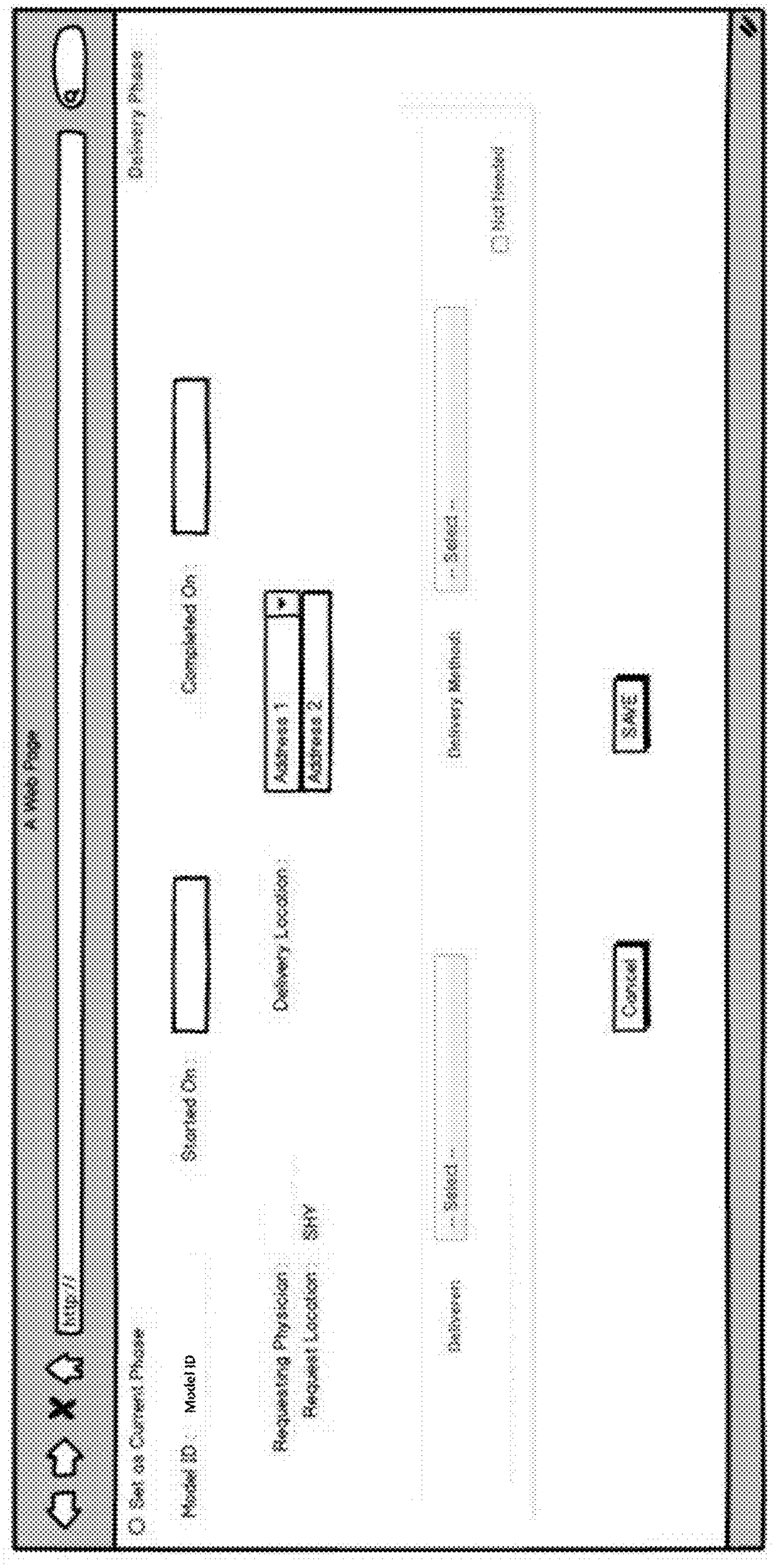

FIGS. 36 and 37 include examples of user interface screens illustrating an overview of the Post-Processing Stage. In this Stage, 3D files associated with a Build will be displayed along with relevant production information (e.g., quantity, machine-specific post-processing activities, etc.). The user can record the quantity of each Object that was post-processed in accordance with the procedures/processes assigned to the Object in the CAD Stage. Additionally, the user may be responsible for recording the "Started On" and "Completed On" dates and the time spent post-processing the Build. If fewer files are recorded as processed than were printed, the file is returned to the Build Queue with the updated file copies necessary to complete the request.

Requests can begin as one Model ID and through the CAD process can comprise any number of individual components. Some components benefit from one printing technology more than others, so this update allows a user to add individual components to a queue of components that are designated to be printed with a specific technology (e.g., SLA, MJF, SLS, and others). Once there are enough parts accumulated under that technology to make printing them feasible, the user can create a Build ID which contains numerous components from many different Model Ids and is assigned to a specific printer, material, etc. After the parts have been printed, the records are transferred to an Inspection queue as individual parts and subsequently to a delivery queue (assuming they pass inspection) as a fully assembled model or package. In various embodiments, tools are provided for use in connection with records flowing throughout the process, including instances in which a part of a model or device would have to be reprinted, redesigned, etc. The process is designed to limit or eliminate situations in which models are delivered with less than all of their required components.

FIGS. 38 through 41 include examples of user interface screens illustrating an overview of the Inspection/Delivery Phase. In this Phase, the individual 3D files leaving the Print Phase are matched with their original Model IDs and presented to the users as such to perform inspection and delivery tasks. Only Model ID's which contain at least one successfully printed file will appear in this Phase. With regard to the Inspection Stage, users record the results of Object inspection. Whether or not the record moves to the Delivery Stage is determined by the process's logic once the user selects the "Save" button. If all files are present and pass inspection, the record will proceed. If a file within the record failed inspection, the user records the number of each part that failed and sends the File back to the Build Queue by pressing the "Send back to Build Queue" button. The file and appropriate quantity will be sent back to the Build Queue to be reprinted and the process will keep the record (Model ID) in the Inspection Stage until the reprinted file passes inspection. With regard to the Delivery Stage, users may be responsible for recording the "Started On" and "Completed On" dates in the provided fields. Additionally, the need to ship Objects to Requestors at various locations necessitated the implementation of conditional logic which links data entered in the Request Queue (Requestor and Site) to address information stored in the Admin Tab. Therefore, in the Delivery Stage, the delivery address for the record is viewable and a label can be automatically generated and printed. The user can then enter their name in the provided "Deliverer" field, by selecting it from the dropdown list (managed in the Admin Tab) and selecting the delivery method used from the "Delivery" dropdown list (managed in the Admin Tab).

Figure 42:
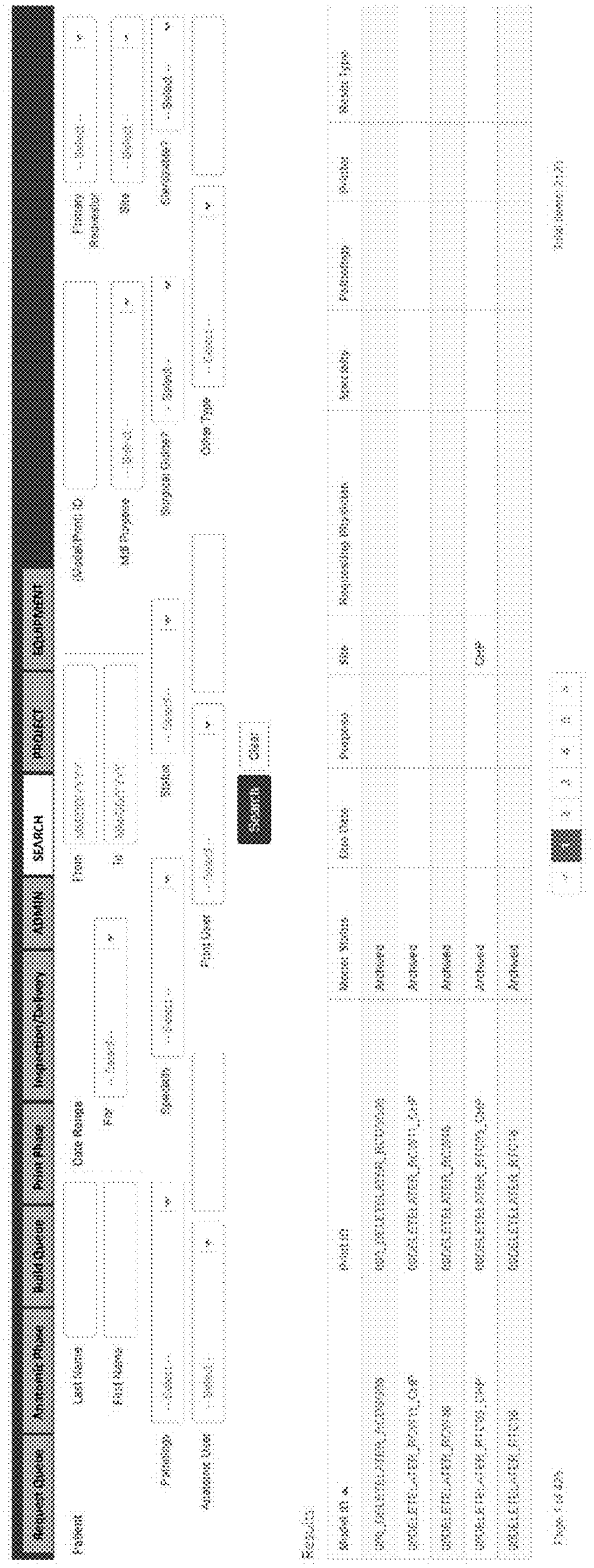

FIG. 42 includes an example of a user interface screen illustrating Search Tab functionality and features. In various embodiments, the Search Tab provides users with the capability to search for records within the three-dimensional printing process. All requests, past, present, and currently in the Request Queue, may be searchable in this Tab by any recorded parameter. For instance, records can be searched by patient name, pathology, date, specialty, Requestor, Segmenter, Designer, Reviewer, Purpose, and/or Site, among others. Any parameter that is tracked or otherwise recorded throughout the production cycle is in essence a searchable field in this Tab. This Tab pulls information from a custom-built database which can be transferred to any third-party analytics process for report generation, resource management, etc.

Figure 43:
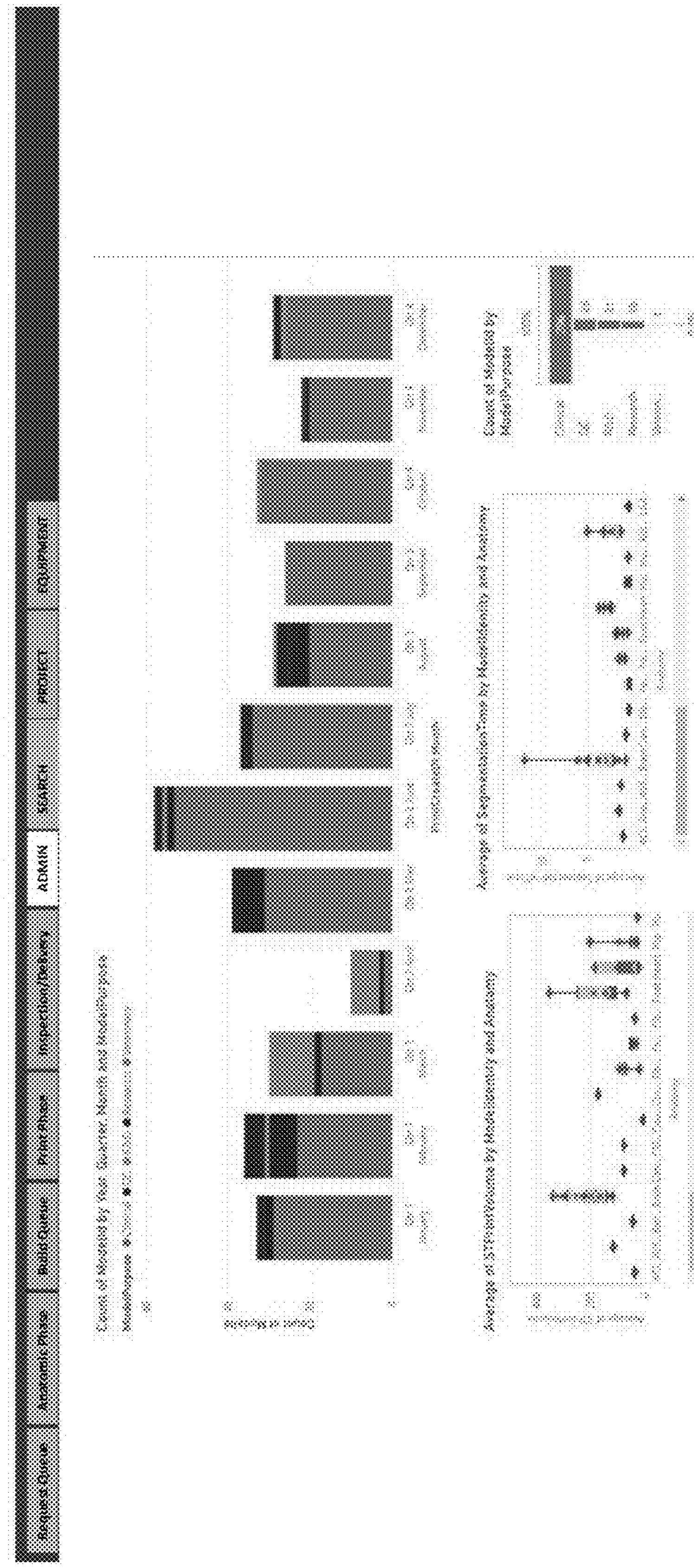
FIG. 43 includes an example of a user interface screen illustrating certain data analytics related embodiments of the invention.

FIG. 43 includes an example of a user interface screen illustrating certain data analytics related embodiments of the invention. As the data captured by the process is stored in a database, it is amenable to the generation of analytics and information boards. This is possible via connection of the database to any number of third-party data analysis tools (e.g., Excel, Power BI, and others). The process will have integrated analytics that can be customized. An example of a data analytics dashboard is shown in FIG. 43. Examples of dashboard data include printing volume over time, organ system, project, requestor, surgical specialty, etc. Other examples of dashboards will include a view of current printing consumable usage and inventory status, staff-logged hours and current work queue (global and staff-level. Analytics will also allow for the display of manufacturing costs based on personnel time, material and printer use, etc. (via predefined, user-selected, or user-defined formulas). Cost and material use per Object type, project, project type, etc., can be viewed as well. Custom creation of analytics dashboards will be included as well, allowing for the display of data in numerous graphical formats.

FIGS. 44 and 45 include examples of user interface screens illustrating visualizations of cost calculation data and accessing and manipulating cost calculation data. Throughout the production process, the process collects information relevant to either user-defined or predefined cost formulas and routinely updates the cost of every Object and associated Model ID and the record moves through the process. Furthermore, the cost information can be viewed in two ways: it can be presented along with the Model ID during the Shipping Stage for individual models or in the Projects Tab (as defined previously). The final cost of all models can be tracked and aggregated within the Admin Tab, and this allows the user to search by model type and return an average/median cost for that model type. This functionality can allow the user to more efficiently and effectively quote accurate models to prospective requestors, and it can facilitate annual or quarterly report generation, for example.

Figure 47:
Figure 48:
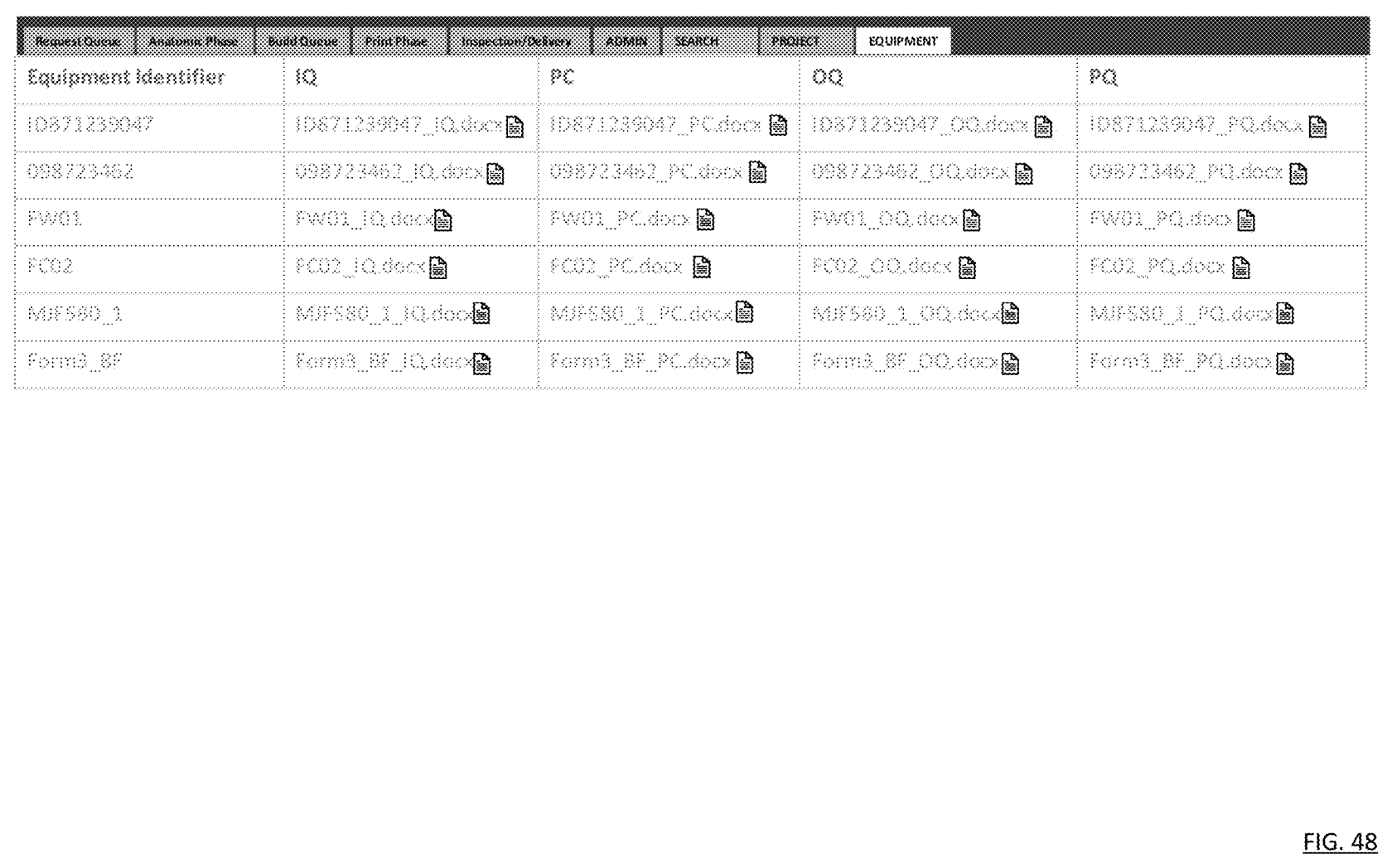

FIGS. 46 through 48 include examples of user interface screens displaying data and other information associated with an Equipment Tab. The Equipment Tab can be configured to show each equipment unit, listed with the last maintenance date, equipment name, machine type, and type of maintenance performed. The equipment can be displayed in a Table or Kanban-view, and each machine may have a button next to it that allows the user to create a maintenance record. Upon pressing the button, the complete maintenance history of the selected equipment can be displayed. There will be machine-specific columns which allow the user to enter corresponding information to the tasks which have been completed. Columns include actions connected to the specific type of machine selected and can include, but are not limited to, printer leveling, firmware updates, hardware replacements, consumable changes, etc. Installation Qualification (OQ), Process Characterization (PC), Operational Qualification (OQ), and Performance Qualification (PQ) can also be entered and stored with each unit of equipment's records in the Equipment Tab. Furthermore, this Tab can also contain the OEM support ticket history. Data like this can be generated and displayed for all program equipment, including process programs used in the creation of deliverables. With regard to certain QA/QC/Preventative Maintenance (PM) features, the Equipment Tab will facilitate documentation and execution of quality assurance, quality control, and preventative maintenance efforts across all operations by program staff. As mentioned above, IQ, PC, OQ, and PQ records for each unit of equipment will be stored in the Equipment Tab. Users will have the ability to track inspection results (physical measurements, visual inspections, go/no-go gauge results, scans of the parts, etc.) of IQ, OQ, PQ, and ongoing PM. Users will have the ability to record the results of their testing. The results can be tracked in a systematic fashion over time, and the life of each unit of equipment can be managed depending on the results of each inspection. Users will have the ability to upload 3D scan data, original 3D part files, and files comparing the two data sets to one another, and highlight any non-conformities that may result. Users will have the ability to automatically generate a non-conformity report by selecting the option to do so. Visible in the Equipment Tab.

Figure 49:
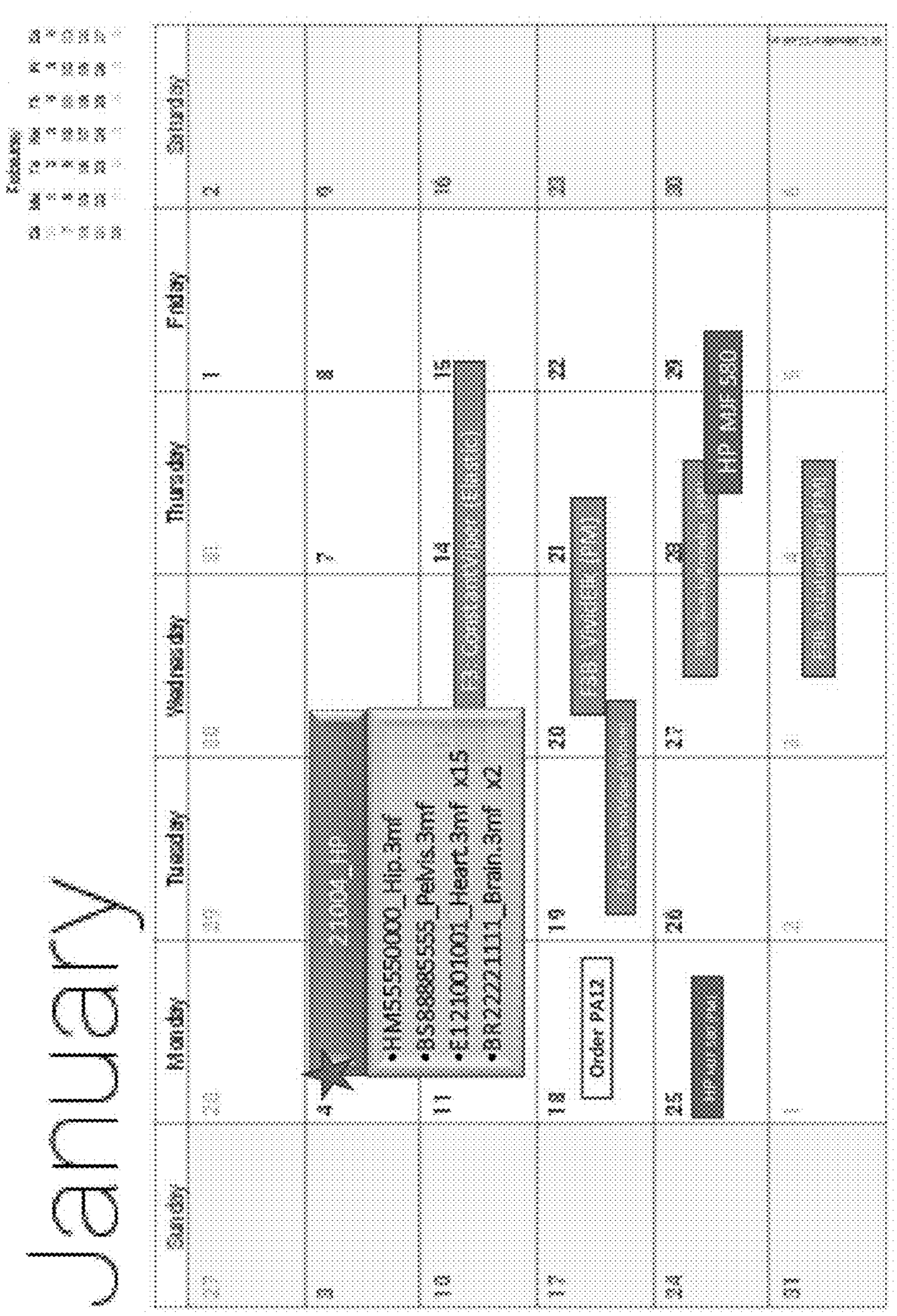
FIGS. 49 and 50 include examples of user interface screens displaying features and functions associated with a calendar-based scheduling interface.
Figure 50:
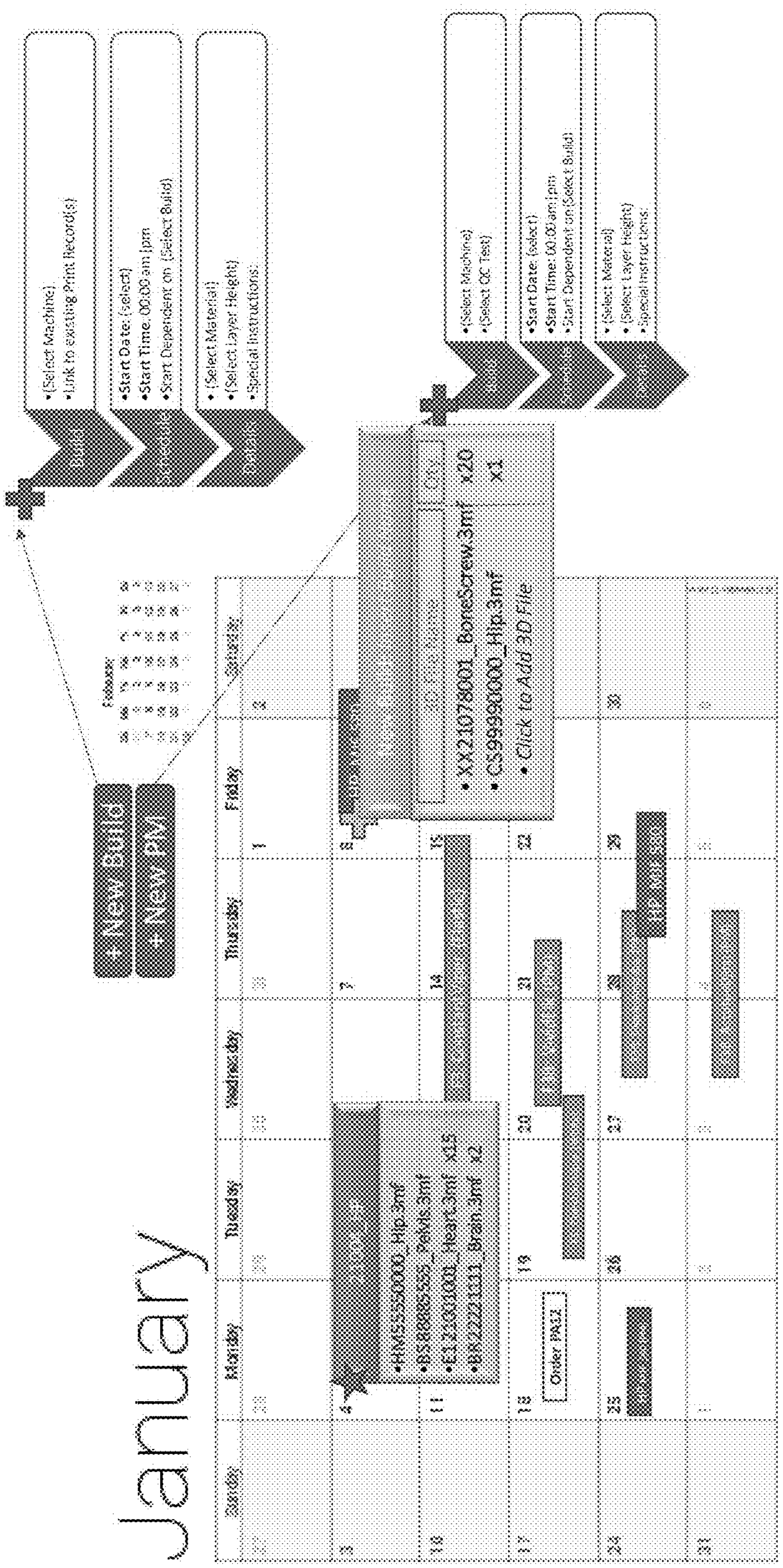

FIGS. 49 and 50 include examples of user interface screens displaying features and functions associated with a calendar-based scheduling interface. In connection with certain Calendar View embodiments of the invention, users may choose to change the way they view upcoming Builds, PM activities, scheduled ordering, or the way they generate new Builds or PM activities by selecting the Calendar View. The Calendar View can be programmed to display completed, current, and upcoming Builds for the month being viewed. The duration of a Build can be interpreted by the length of the Build's icon on the calendar. Hovering over the icon may be configured to display more details of the Build. Clicking on an icon associated with the Build may allow users to add 3D files to the Build (if the Build has not been executed yet), or can allow users to view the 3D files that were printed in the Build if the Build has already been executed. Users may also add or view the quantity of each 3D file included in the Build. Those with administrative privileges may determine color-coding schemes to meet their program's needs. Colors can be assigned to icons/ records by machine type, status, or record type. When a Build is scheduled to start or finish, the process will display a notification within the applications window, alerting users of the activity. Users may also register to receive text and email notifications to provide alerts when Builds start or finish, per the record start and end times added to the process. In certain embodiments, print durations may be accessed via information manually added to a Print Record or via a product's APIs.

In certain aspects, two buttons may be displayed in the calendar view window, one which allows users to add a new Build record, and another which allows users to add a new preventative maintenance record. Clicking either button expands a menu which allows users to enter information regarding the Build and its schedule. Once the record has been saved, the Build's icon will appear on the calendar, but it will remain editable until the Build has been executed. Once the Build has been executed, the record can be viewed as read-only. If a Build has been scheduled to run on a particular printer on a particular date/time, and a user attempts to create another Build or preventative maintenance record which overlaps a previously scheduled Build or preventative maintenance record, the user will be alerted by the process and will not be able to save the record until a new start date/time is selected. The calendar view populates with reminders alerting users to schedule consumables. Those with administrative privileges can adjust process settings so that these reminders appear with enough lead-time to allow for order-processing and shipping of materials. The reminders are driven by consumable levels that are tracked by the process inventory functions. Reminders may also be configured to email or text users, directly alerting the necessary party when a task requires their attention. The calendar view may be configured, per user, to display assigned or unassigned tasks and/or records associated with any Stage of the Anatomic or Print Phases. For example, a user may want to view all anatomic models in the queue, by their respective due dates, in the calendar view, in addition to all Builds and preventative maintenance icons.) In various embodiments, integrated notification features can be included with processes monitored by the process to enable the user to set custom notifications for any Stage in the process. This idea extends to Object creation, QA/QC/PM actions, and ordering consumables. It will be completely modular and can give the user the option to opt into text messages, emails, and app-based alerts.

Figure 51:
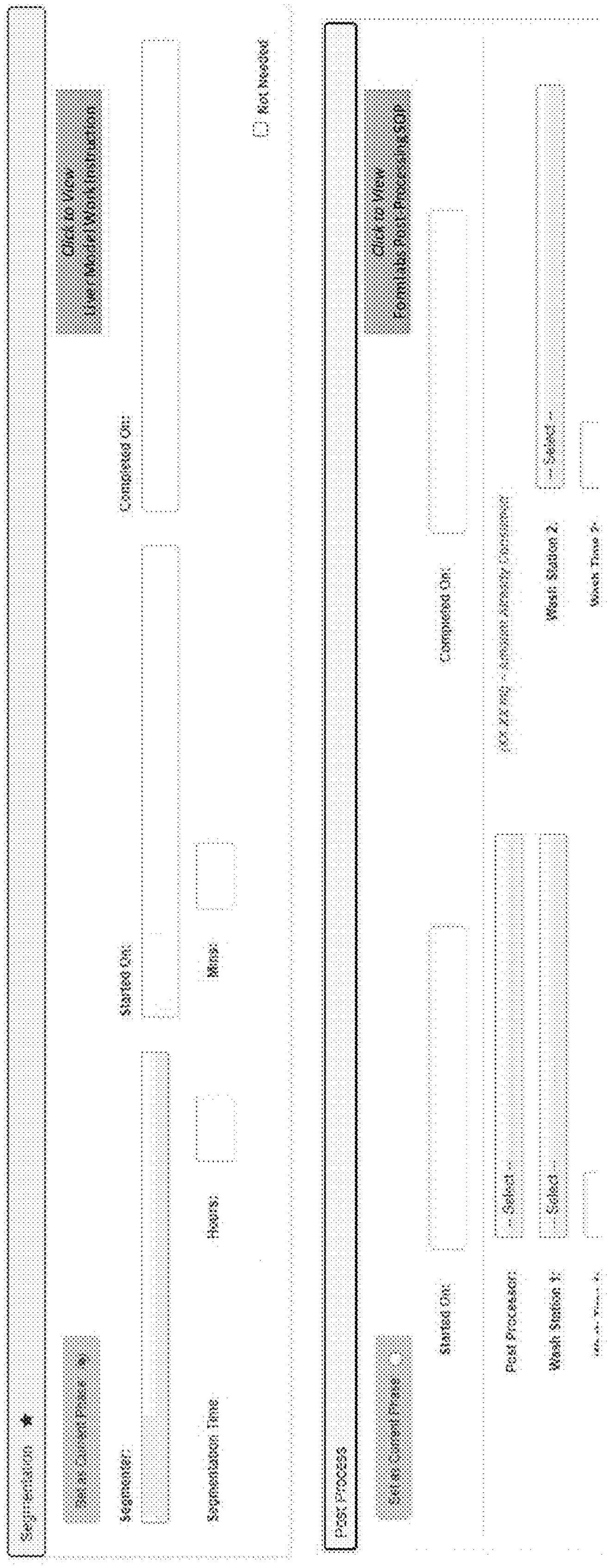
FIG. 51 includes an example of a user interface screen illustrating making certain standard operating procedure (SOP) and work instructions available to users through the process.

FIG. 51 includes an example of a user interface screen illustrating making certain standard operating procedure (SOP) and work instructions available to users through the process. In various embodiments, throughout the production cycle (in all Phases and Stages), hyperlinks to all work instructions (WIs) and standard operating procedures (SOPs) can be made available to the user. For instance, if the user is working on an anatomic model, the work instructions for Image Review, Segmentation, Physician Review, etc., can be presented to the user at the corresponding Stage. Furthermore, this practice remains consistent across the Admin Tab, Project Tab, and Equipment Tab, and other associated Phases/Tabs.

In other embodiments, FIGS. 52A and 52B illustrate examples of how the process can be integrated with the application programming interfaces (APIs) of other products or software. In certain accessibility embodiments of the invention, the process can be configured to be cross-platform and include web-based and app-based versions, for example. This can allow for substantially seamless data communication transitions between walking on the lab floor and sitting at a desk, allowing program employees to always have access to program requests and records.

The examples presented herein can be intended to illustrate potential and specific implementations of the present invention. It can be appreciated that the examples can be intended primarily for purposes of illustration of the invention for those skilled in the art. No particular aspect or aspects of the examples can be necessarily intended to limit the scope of the present invention. For example, no particular aspect or aspects of the examples of system architectures, user interface layouts, or screen displays described herein can be necessarily intended to limit the scope of the invention.

It is to be understood that the figures and descriptions of the present invention have been simplified to illustrate elements that can be relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention as may be defined by such means-plus-function claims, resides in the fact that the functionalities provided by the various recited means can be combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that can be located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium.

Thus, the operation and behavior of the embodiments can be described without specific reference to the actual software code. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs) remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations can be performed by one or more remote processing devices that can be linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by an application specific processor.

Additionally, it is to be appreciated that the embodiments described herein illustrate example implementations, and that the functional elements, logical blocks, modules, and circuits elements may be implemented in various other ways which can be consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification can be not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms can be not necessarily intended as synonyms for each other. For example, some embodiments may be described using the terms "comlected" and/or "coupled" to indicate that two or more elements can be in direct physical or electrical contact with each other. The term "coupled," however, also may mean that two or more elements can be not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and can be comprised within the scope thereof. Furthermore, all examples and conditional language recited herein can be principally intended to aid the reader in understanding the principles described in the present disclosure and the concepts contributed to furthering the art, and can be to be construed as being without limitation to such specifically recited examples and conditions. Moreover, all statements herein reciting principles, aspects, and embodiments as well as specific examples thereof, can be intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein Although various systems described herein may be embodied in software or code executed by general purpose hardware as discussed above, as an alternative the same may also be embodied in dedicated hardware or a combination of software, hardware and/or dedicated hardware. If embodied in dedicated hardware, each can be implemented as a circuit or state machine that employs any one of or a combination of a number of technologies. These technologies may include, but can be not limited to, discrete logic circuits having logic gates for implementing various logic functions upon an application of one or more data signals, application specific integrated circuits having appropriate logic gates, or other components, etc. Such technologies can be generally well known by those of ordinary skill in the art and, consequently, can be not described in detail herein.

The flow charts and methods described herein show the functionality and operation of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations can be within the scope of the present disclosure.

The terms "a" and "an" and "the" and similar referents used in the context of the present disclosure (especially in the context of the following claims) can be to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as though it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein can be not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations, and adaptations to those embodiments may occur to persons skilled in the art with the attainment of some or all of the advantages of the present invention. The disclosed embodiments can be therefore intended to include all such modifications, alterations, and adaptations without departing from the scope and spirit of the present invention as claimed herein.

What is claimed is:

1. A computer-based workflow management method for use in connection with a process for printing a physical an object with a three-dimensional printer, the workflow management method comprising:

executing a request queue phase comprising receiving, in a request queue module operatively associated with an electronic processor, instructions for defining a request for printing the physical object;

executing an anatomic modeling phase comprising generating, by an anatomic model module operatively associated with the processor, an anatomic three-dimensional model representing the physical object;

executing a build phase comprising printing, by a build phase module operatively associated with the processor, the physical an object in response to the generated anatomic model; and tracking, by an administrative module operatively associated with the processor, the printed physical object of the anatomic three-dimensional model for a medical patient.

2. The method of claim 1, wherein the object comprises a medical device.

3. The method of claim 1, wherein executing the anatomic modeling phase further comprises executing an image review stage for the object.

4. The method of claim 1, wherein executing the anatomic modeling phase further comprises executing a segmentation stage for the object.

5. The method of claim 1, wherein executing the anatomic modeling phase further comprises executing a physician review stage for the object.

6. The method of claim 1, wherein executing the anatomic modeling phase further comprises executing a computer aided design stage for the object.

7. The method of claim 1, wherein executing the anatomic modeling phase further comprises executing a design review stage for the object.

8. The method of claim 1, wherein the build phase further comprises executing a print preparation stage and a post-processing stage.

9. The method of claim 1, further comprising executing an inspection/delivery phase comprising facilitating inspection of component parts of the object and facilitating delivery of the printed object to a requesting client.

10. The method of claim 1, wherein the defined request comprises data associated with a model purpose, an imaging type, and a model definition.

11. The method of claim 10, further comprising generating a file name for the defined request comprising a combination of alphanumeric data associated with the model purpose, the imaging type, and the model definition.

12. The method of claim 10, wherein the model purpose comprises at least one of a clinical purpose, research purpose, education purpose, medical device purpose, research and development purpose, quality control purpose, veterinary purpose, or a combination thereof.

13. The method of claim 10, wherein the imaging type comprises at least one of picture archiving and communication system, outside imaging, three-dimensional surface scan, no imaging, or a combination thereof.

14. The method of claim 10, wherein the model definition comprises category of device data including anatomical model, part, accessory, research and development, production, or a combination thereof.

15. The method of claim 1, further comprising attributing the defined request to a project number.

16. The method of claim 1, further comprising generating at least one user interface screen programmed for visualizing multiple three-dimensional print jobs in association with at least one phase.

17. The method of claim 16, further comprising communicating, by the user interface screen, an indication of whether a phase or stage is not needed, not started, in progress, or completed.

18. The method of claim 1, further comprising generating and displaying content in a Kanban style view in association with at least one phase or stage of the printing process.

19. The method of claim 1, further comprising generating a link to work instructions or standard operating procedures in association with at least one phase or stage of the printing process.

20. The method of claim 1, further comprising generating a user interface screen displaying equipment data comprising equipment unit, last maintenance date, equipment name, machine type, and type of maintenance performed, in connection with equipment associated with at least one phase or stage of the printing process.

21. The method of claim 1, further comprising generating a user interface screen displaying a calendar-based scheduling interface, including at least one feature or function associated with at least one phase or stage of the printing process.

22. The method of claim 1, wherein executing the request queue phase further comprises receiving medical imaging data from an electronic medical record.

23. The method of claim 1, wherein executing the request queue phase further comprises receiving medical imaging data from a radiology information system.

* * * * *